(12) United States Patent
Kernick et al.

(10) Patent No.: US 11,741,853 B2
(45) Date of Patent: Aug. 29, 2023

(54) LIGHT-SENSITIVE PHOTOCHROMIC CONTACT LENS DEMONSTRATION DEVICES AND RELATED METHODS

(71) Applicant: Johnson & Johnson Vision Care, Inc., Jacksonville, FL (US)

(72) Inventors: Edward R. Kernick, St. Johns, FL (US); Michael Allen Coppes, Ponte Vedra, FL (US); Zohra Fadli, Jacksonville, FL (US); Leilani Keahi Sonoda, Atlantic Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 1085 days.

(21) Appl. No.: 16/411,865

(22) Filed: May 14, 2019

(65) Prior Publication Data
US 2020/0365056 A1 Nov. 19, 2020

(51) Int. Cl.
*G09B 23/28* (2006.01)
*G02C 7/04* (2006.01)
*G02C 7/10* (2006.01)

(52) U.S. Cl.
CPC ........... *G09B 23/28* (2013.01); *G02C 7/04* (2013.01); *G02C 7/102* (2013.01)

(58) Field of Classification Search
CPC ......... G02C 7/102; G02C 7/04; A61B 3/125; A61B 3/0008; A61B 3/063; F21S 10/02; F21S 10/023; F21V 9/40; G01M 11/0285
(Continued)

(56) References Cited

U.S. PATENT DOCUMENTS 4,505,683 A * 3/1985 Schurle ............... G01N 17/004
434/365
8,497,639 B2 7/2013 Tsang et al.
(Continued)

FOREIGN PATENT DOCUMENTS

CN 203881517 U 10/2014
CN 204679248 U 9/2015
(Continued)

OTHER PUBLICATIONS

Author Unknown, "AP3156 High Efficiency 1X/1.5X/2X Charge Pump for White LED Applications," Product Data Sheet, Rev. 1, Sep. 2009, Diodes Incorporated, https://www.diodes.com/assets/Datasheets/AP3156.pdf, 15 pages.
(Continued)

*Primary Examiner* — Christopher Stanford
(74) *Attorney, Agent, or Firm* — Kristina Okafor

(57) ABSTRACT

Light-sensitive photochromic contact lens demonstration devices and related methods are disclosed. To provide for the convenient and efficient demonstration of a photochromic contact lens change, the demonstration device includes a controllable lighting-emitting device to expose a demonstrated photochromic contact lens to UltraViolet (UV) and/or High-Energy Visible (HEV) light to cause a photochromic contact lens to change from a non-darkened to darkened state. The demonstration device also includes a viewing window that allows viewing of the contact lens changing from a non-darkened to darkened state as a result of exposure to UV/HEV light and back to a non-darkened state when the light is removed. Further, the photochromic contact lens demonstration device can also include an optional heating circuit to heat the photochromic contact lens during demonstration to cause the photochromic contact lens to
(Continued)

change from a darkened state back to a non-darkened state more quickly.

36 Claims, 34 Drawing Sheets

(58) Field of Classification Search
USPC ......... 434/365, 370, 395, 399; 356/124, 128
See application file for complete search history.

(56) References Cited

U.S. PATENT DOCUMENTS

| | | | | |
|---|---|---|---|---|
| 2007/0206377 | A1* | 9/2007 | Borup | A45C 11/005 |
| | | | | 362/156 |
| 2010/0007873 | A1* | 1/2010 | Cado | G01M 11/0207 |
| | | | | 356/124 |
| 2011/0024649 | A1* | 2/2011 | Merkle | A45C 11/005 |
| | | | | 250/492.1 |
| 2014/0225049 | A1 | 8/2014 | Chopra et al. | |
| 2018/0299345 | A1* | 10/2018 | Koenig, II | G01N 21/8422 |
| 2021/0055575 | A1* | 2/2021 | Park | G02C 7/102 |
| 2022/0122485 | A1* | 4/2022 | Carpenter | G09B 23/22 |

FOREIGN PATENT DOCUMENTS

| | | |
|---|---|---|
| DE | 202006015703 U1 | 2/2007 |
| EP | 2321572 A2 | 5/2011 |
| FR | 2966594 * | 4/2012 |

OTHER PUBLICATIONS

Author Unknown, "TMP709-Q1 Automotive, Resistor-Programmable Temperature Switch in SOT Package," Product Data Sheet, Dec. 2016, Texas Instruments Incorporated, https://www.mouser.in/ds/2/405/tmp709-q1-1077475.pdf, 24 pages.

PCT Search Report for Application No. PCT/IB2020/054586 date of Written Opinion dated Jul. 21, 2020.

* cited by examiner

| WORKING CONDITION | VISIBLE LEDS (258) | UV/HEV LEDS (256) |
|---|---|---|
| STANDBY } STANDBY OP. MODE | OFF | OFF |
| HEATING } HEATING OP. MODE | PULSING | OFF |
| CONSTANT TEMPERATURE | ON | OFF |
| HEV/UV LIGHT } DEMO OP. MODE | OFF 10S/ON 170S | ON 10S/OFF 170S |

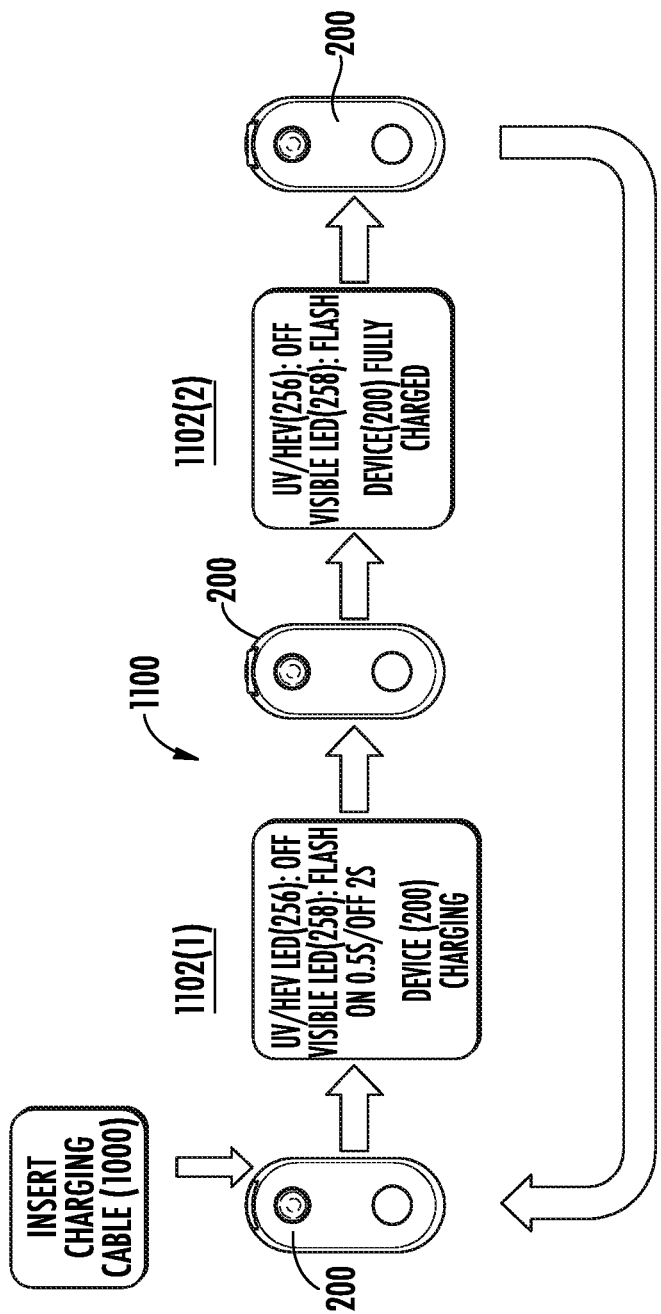

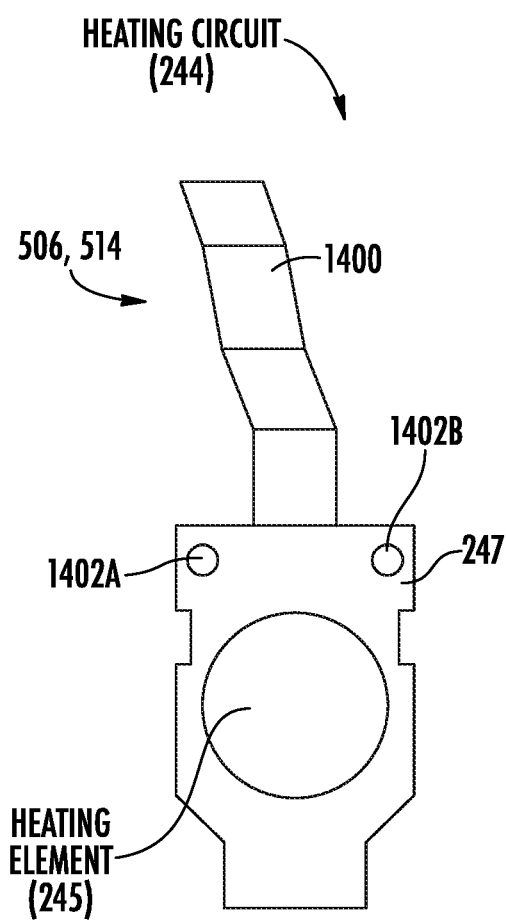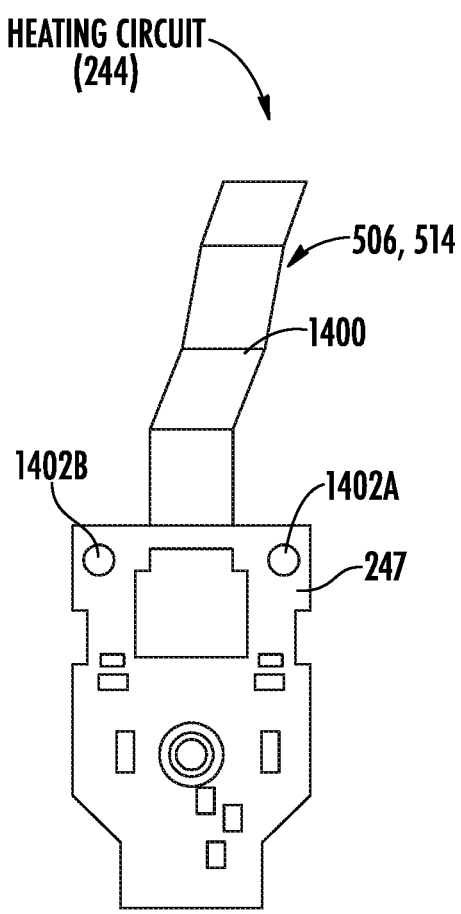
FIG. 14A
FIG. 14B

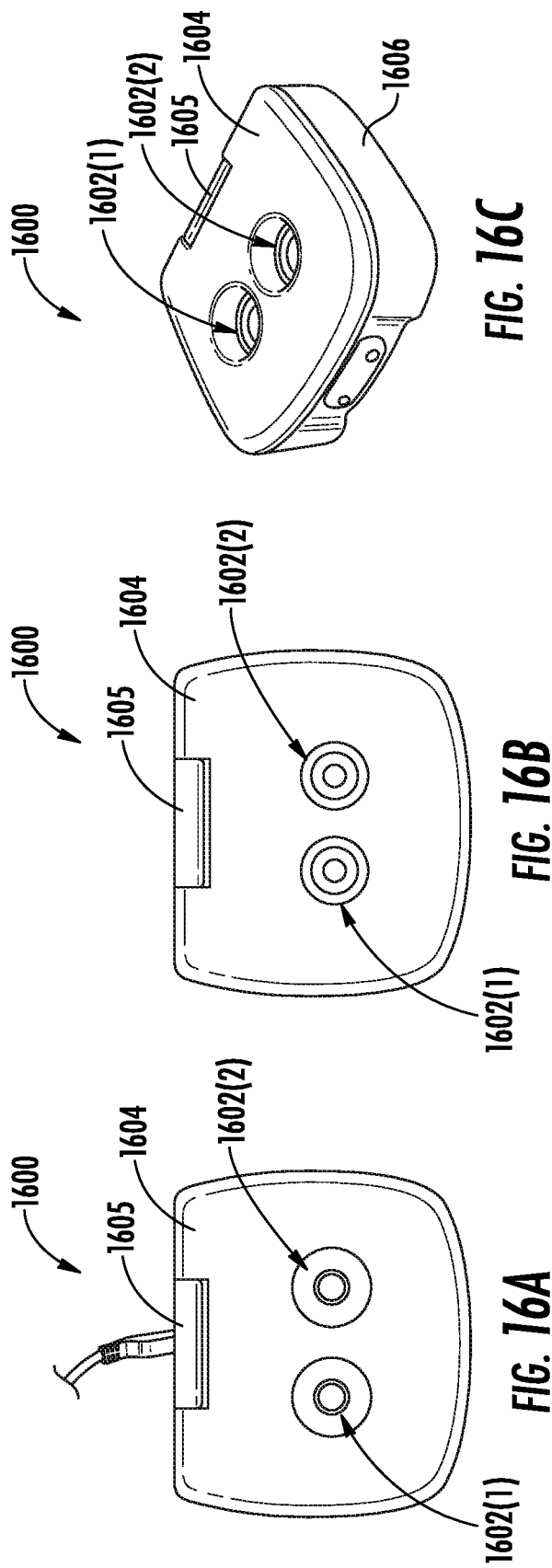

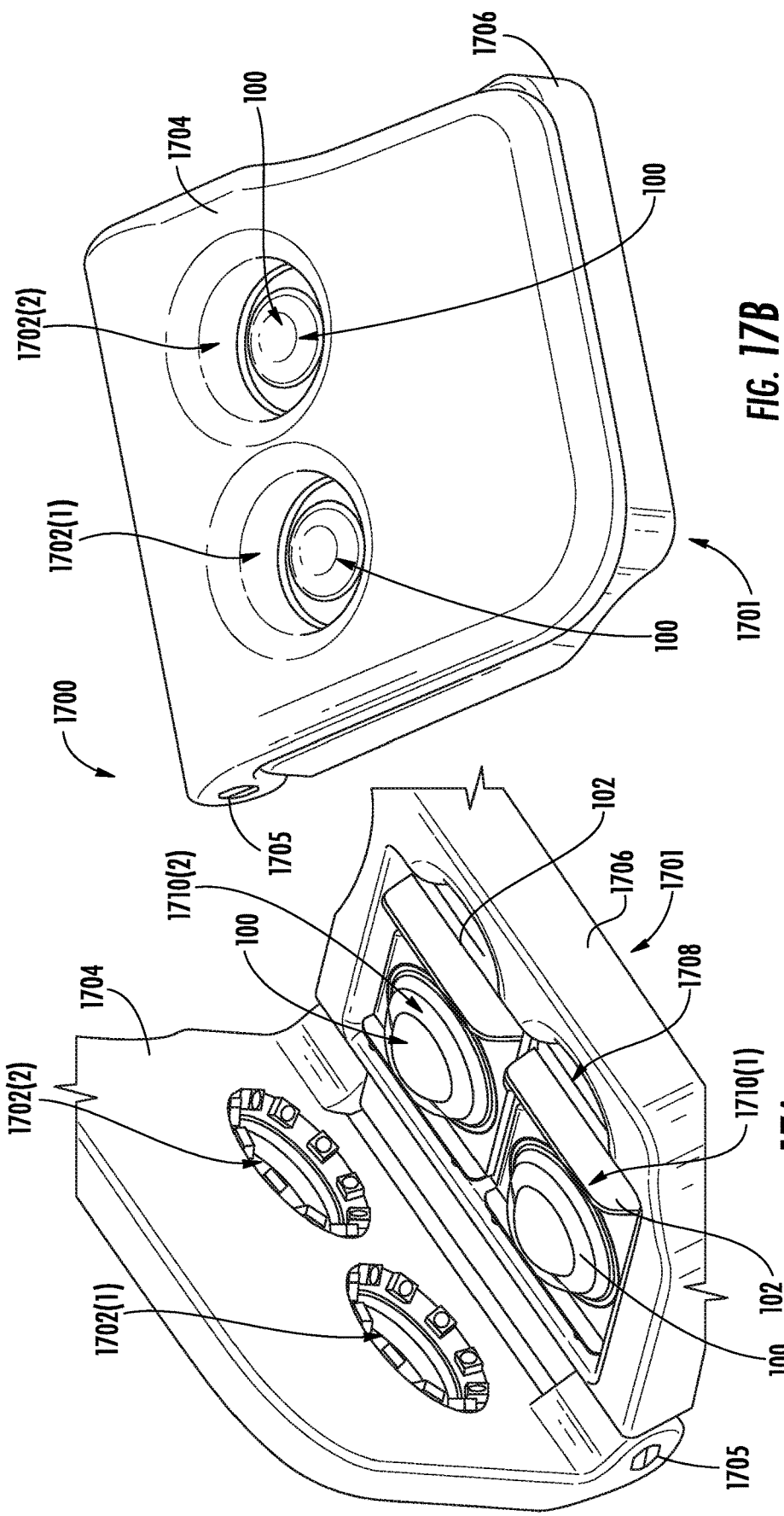

LIGHT-SENSITIVE PHOTOCHROMIC CONTACT LENS DEMONSTRATION DEVICES AND RELATED METHODS

FIELD OF THE DISCLOSURE

The field of the disclosure relates to contact lenses, and more particularly to photochromic contact lenses that are configured to change from a clear, non-darkened normal state to a darkened state when activated by exposure to UltraViolet (UV) and/or High-Energy Visible (HEV) light.

BACKGROUND

Eyeglasses exist that have photochromic lenses, also referred to as "Transitions" lenses. Photochromic lenses include a material(s) that reacts to and darkens in response to exposure to UltraViolet (UV) and/or High-Energy Visible (HEV) light. The reaction of the lens darkening serves to filter out across the visible light spectrum, including blocking UVA and/or UVB radiation that can be harmful to the eyes. The earliest glass photochromic lenses relied on silver chloride or silver halide to react to UV light and darken. Today's photochromic lenses use compounds that undergo chemical reactions (e.g. via Claisen Rearrangement) shifting the chemical structure into an open state equilibrium allowing the lens to darken based on the intensity and wavelengths of the UV and/or HEV light and the thermal conditions. Removal of the light exposure will cause the compound to shift to a more closed state equilibrium causing the photochromic lenses to return to a normal, clear, non-darkened state.

Soft contact lenses have been available since the 1980s. Recently, soft contact lenses have been designed by Johnson & Johnson Vision Care, Inc. under the brand name ACUVUE® OASYS with Transitions™ that include photochromic materials to adapt and darken in response to exposure to UV and/or HEV light. An example of this photochromic contact lens is discussed in U.S. Patent Application Publication No. 2014/0225049 entitled "PHOTOCHROMIC MATERIALS HAVING EXTENDED PI-CONJUGATED SYSTEMS AND COMPOSITIONS AND ARTICLES INCLUDING THE SAME," which is incorporated herein by reference in its entirety. These photochromic contact lenses provide contact lens wearing patients the opportunity to enjoy the benefits of reducing bothersome light. FIG. 1A is a picture of packaged ACUVUE® OASYS with Transitions™ (photochromic) soft contact lenses 100 manufactured by Johnson & Johnson Vision Care, Inc. in individual contact lens packages 102. FIG. 1B is picture of a photochromic soft contact lens 100N in a normal, non-darkened state and another photochromic soft contact lens 100T in a darkened state after exposure to UV and/or HEV light.

Typically, the amount of a photochromic material needed to achieve a desired optical effect when incorporated into a composition or article will depend, in part, on the amount of actinic radiation that the photochromic material absorbs on a per molecule basis. That is, the more actinic radiation that the photochromic material absorbs on a per molecule basis, the more likely (i.e., the higher the probability) the photochromic material will transform from the closed-form to the open-form. Photochromic compositions and articles that are made using photochromic materials having a relatively high molar absorption coefficient (or "extinction coefficient") for actinic radiation may generally be used in lower concentrations than photochromic materials having lower molar absorption coefficients, while still achieving the desired optical effect.

As discussed above, removal of UV/HEV light exposure from photochromic lenses causes the lenses to return to a normal, non-darkened state. Photochromic materials used in photochromic lenses adjust from a non-darkened state to a darkened when exposed to UV light. Due to the thermal sensitivity of photochromics, the fade rate going from the darkened state to the non-darkened state will be faster at body temperature than ambient temperature, which inherently will affect the level of darkness. For example, a photochromic lens may change from a normal, non-darkened state to a very darkened state when exposed to UV light when the lens is at room temperature. The photochromic lens may then fade back to a non-darkened state slowly versus if the lens were in contact with the cornea at ocular temperature (i.e., body temperature) causing the lens to become less dark when exposed to light, and thus fading back to a non-darkened state significantly faster. This can make the demonstration of a photochromic contact lens to represent on-eye performance by a doctor or other technician to potential purchaser patients difficult due to unrealistic darkness levels and slow fade rates.

SUMMARY OF THE DISCLOSURE

Aspects disclosed herein include light-sensitive photochromic contact lens demonstration devices, and related methods. The photochromic contact lens demonstration device facilitates the easy and convenient demonstration of the adaptation of a photochromic contact lens from a normal, non-darkened (e.g., clear) state to a darkened state without having to go outside to expose the lens to sunlight. For example, it may be desired by a doctor or technician to be able to demonstrate the change of a photochromic contact lens to a patient in an office environment as part of the patient's decision to purchase photochromic contact lenses. A photochromic contact lens changes from a normal, non-darkened state to a darkened state as a function of exposure to UltraViolet (UV) and/or High-Energy Visible (HEV) light.

Thus, in exemplary aspects disclosed herein, to provide for the convenient and efficient demonstration of the change of a photochromic contact lens, in examples disclosed herein, the photochromic contact lens demonstration device is provided as a contact lens demonstration device that includes a lighting-emitting device to expose a demonstrated photochromic contact lens to UV/HEV light. The photochromic contact lens demonstration device includes a cavity that is configured to receive a packaged photochromic contact lens to be demonstrated. In examples disclosed herein, the cavity is sized to be able to receive a packaged photochromic contact lens so that the photochromic contact lens is protected from damage during the demonstration and so that the contact lens does not have to be disposed of after the demonstration. The photochromic contact lens demonstration device includes a viewing window that allows one to see the contact lens when fully disposed into the cavity to show the change of the contact lens from a non-darkened to a darkened state. To cause the inserted contact lens to change from a non-darkened (e.g., clear) to a darkened state in a demonstration process, a control circuit in the photochromic contact lens demonstration device is configured to be activated that causes the UV/HEV lighting-emitting device to emit UV/HEV light to the photochromic contact lens. The cavity of the photochromic contact lens demonstration device is designed to align the contact lens with the UV/HEV light so that the contact lens is exposed to UV/HEV light when the lighting-emitting device is activated. After a period of time of exposure of the photochromic contact lens to the UV/HEV light, the photochromic contact lens will change from a non-darkened to darkened state, which can be seen through the viewing window. The control circuit of the photochromic contact lens demonstration device is also configured to deactivate the UV/HEV light after a period of time to allow the photochromic contact lens to change back to the non-darkened state to demonstrate the full changing from a non-darkened state, to a darkened state, and then back to the non-darkened state.

Generally, photochromic materials used in photochromic lenses change from a non-darkened state to a darker state more quickly when exposed to UV/HEV light at body temperature than when the photochromic material is exposed to UV/HEV light at a lower ambient temperature. In other words, the fade rate of a photochromic lens changing from a non-darkened state to a darkened state is faster when photochromic lens is at body temperature versus a lower ambient temperature. Thus, photochromic materials will also change more quickly from the darkened state back to the non-darkened state after exposure to UV/HEV light is removed at body temperature than a lower ambient temperature for a given period of time, because the photochromic material will have originally changed to a less darkened state when exposed to UV/HEV light at body temperature versus ambient temperature. However, a photochromic contact lens is not installed in a patient at body temperature during demonstration.

Thus, in other exemplary aspects disclosed herein, to simulate the photochromic contact lens being installed in a patient's eye at ocular body temperature to more quickly demonstrate the changing of a photochromic contact lenses from a darkened state back to a non-darkened state, the photochromic contact lens demonstration device can also include an optional heating circuit to heat and elevate the temperature of the photochromic contact lens during demonstration. In this regard, in examples discussed herein, the control circuit of the photochromic contact lens demonstration device can also be configured to activate a heating circuit to activate a heating element to heat the photochromic contact lens inserted into the demonstration device during a demonstration process. The heating circuit is positioned in the assembly of the photochromic contact lens demonstration device with the heating element positioned proximate to the photochromic contact lens when disposed in the cavity for effective heat transfer. The control circuit of the photochromic contact lens demonstration device is configured to activate the heating circuit before and/or during the activation of the light-emitting device to expose the photochromic contact lens to UV/HEV light. This regulates the photochromic contact lens so that it changes to a less dark state than otherwise would occur if the photochromic contact lens were not heated when exposed to UV/HEV light. This then allows the photochromic contact lens to change more quickly from the darkened state back to a non-darkened state when no longer exposed to UV/HEV light. The control circuit of the transition contact lens demonstration device may also be configured to keep the heating circuit activated after a period of time after deactivation of the light-emitting device to allow the photochromic contact lens to change more quickly from the darkened state back to the non-darkened state. The control circuit of the photochromic contact lens demonstration device is configured to deactivate the heating circuit activated after a period of time after deactivation of the light-emitting device.

In this regard, in one exemplary aspect, a contact lens demonstration device is provided. The contact lens demonstration device comprises a housing. The contact lens demonstration device also comprises a cavity disposed in the housing forming an interior surface in the housing comprising a contact lens region. The cavity is configured to receive a contact lens and align the contact lens to the contact lens region. The contact lens demonstration device also comprises a viewing window disposed in an outer surface of the housing axially aligned to the contact lens region. The contact lens demonstration device also comprises a lighting device disposed in the cavity. The lighting device is configured to emit UV or HEV light to the contact lens region. The contact lens demonstration device also comprises a control circuit disposed in the housing and coupled to the lighting device. The control circuit is configured to activate the lighting device to emit UV or HEV light to the contact lens region.

In another exemplary aspect, a method of demonstrating a change of a photochromic lens from a non-darkened state to a darkened state when not inserted into an eye is provided. The method comprises inserting a contact lens into a cavity disposed in a housing to align the contact lens to a contact lens region inside the housing and a viewing window disposed in an outer surface of the housing axially aligned with the contact lens region. The method also comprises activating a control circuit coupled to a lighting device disposed in the cavity. The method also comprises activating the lighting device by the control circuit in response to the activation of the control circuit to cause the lighting device to emit UV or HEV light to the contact lens region to expose the contact lens to the UV or HEV light for a defined demonstration period of time.

In another exemplary aspect, a non-transitory computer-readable medium having stored thereon an instruction program comprising a plurality of computer executable instructions for execution by a processor, to cause the processor to activate a lighting device to cause the lighting device to emit UV or HEV light to a contact lens region disposed in a cavity of a housing to expose a contact lens inserted into the cavity to the UV or HEV light for a defined demonstration period of time.

BRIEF DESCRIPTION OF THE FIGURES

FIG. 9 is a chart illustrating exemplary states of visible and lighting devices in the photochromic contact lens demonstration device in FIGS. 2A-2C during the various operating modes in the demonstration process in FIG. 3;

FIG. 11 illustrates an exemplary battery charging process of the photochromic contact lens demonstration device in FIGS. 2A-2C;

FIGS. 14A and 14B are top and bottom views, respectively, of the heater assembly that includes the heating circuit and heating element mounted on a circuit board with a ribbon interface cable coupled to the heating circuit and configured to be connected to the controller circuit in FIG. 7;

FIGS. 16A-16C illustrate views of another exemplary photochromic contact lens demonstration device configured to receive and position two (2) packaged contact lenses aligned with two (2) viewing windows and that can include the circuits and devices, such as those in the photochromic contact lens demonstration device in FIGS. 2A-2C, to activate a lighting device and heating circuit to apply light and heat to the packaged contact lenses to illustrate the process of a photochromic contact lens changing from a normal, non-darkened state to a darkened state;

FIGS. 17A and 17B illustrate views of another exemplary photochromic contact lens demonstration device in an open and closed configuration and configured to receive and position two (2) packaged contact lenses aligned with two (2) viewing windows and that can include the circuits and devices, such as those in the photochromic contact lens demonstration device in FIGS. 2A-2C, to activate a lighting device and heating circuit to apply light and heat to the packaged contact lenses to illustrate the process of a photochromic contact lens changing from a normal, non-darkened state to a darkened state;

DETAILED DESCRIPTION

Figure 1A:
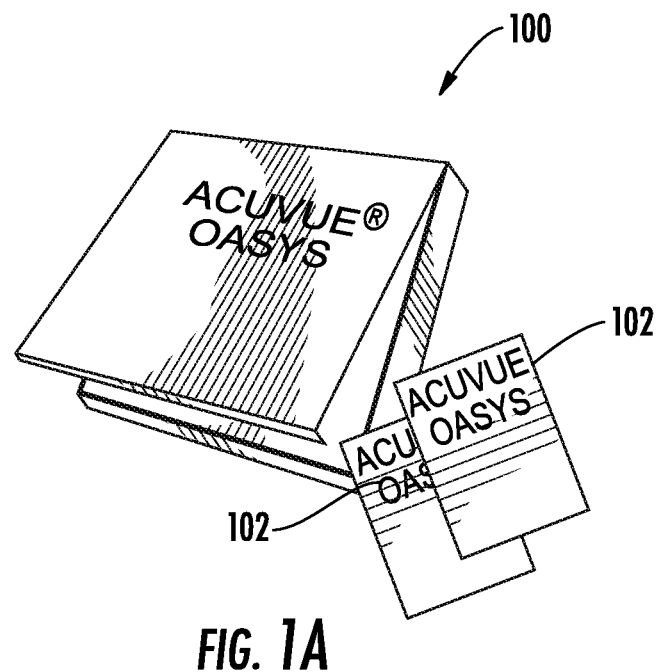
FIG. 1A is a picture of packaged ACUVUE® soft contact lenses manufactured by Johnson & Johnson Vision Care, Inc.
Figure 1B:
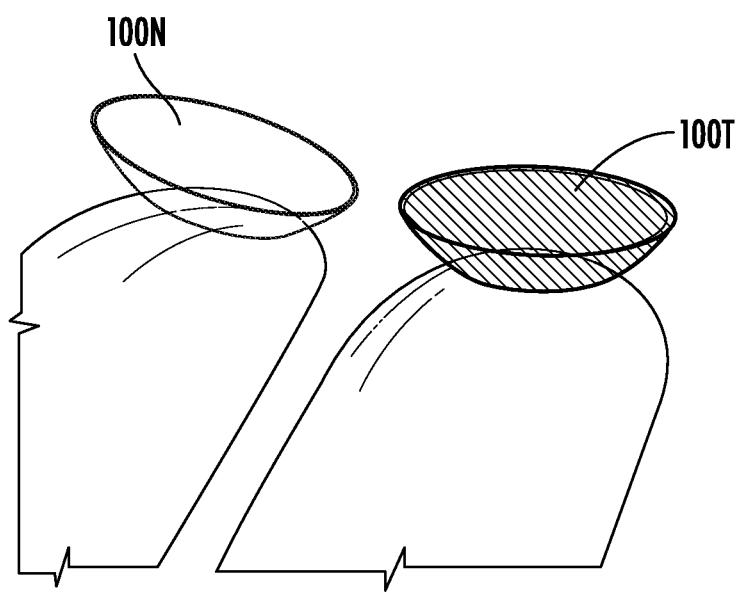
FIG. 1B is picture of a photochromic contact lens in a non-darkened state and another photochromic contact lens in a darkened state after exposure to UltraViolet (UV) and/or High-Energy Visible (HEV) light.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include light-sensitive photochromic contact lens demonstration devices, and related methods. The photochromic contact lens demonstration device facilitates the easy and convenient demonstration of the adaptation of a photochromic contact lens from a normal, non-darkened (e.g., clear) state to a darkened state without having to go outside to expose the lens to sunlight. For example, it may be desired by a doctor or technician to be able to demonstrate the change of a photochromic contact lens to a patient in an office environment as part of the patient's decision to purchase photochromic contact lenses. A photochromic contact lens changes from a normal, non-darkened state to a darkened state as a function of exposure to UltraViolet (UV) and/or High-Energy Visible (HEV) light.

Thus, in exemplary aspects disclosed herein, to provide for the convenient and efficient demonstration of the change of a photochromic contact lens, in examples disclosed herein, the photochromic contact lens demonstration device is provided as a contact lens demonstration device that includes a lighting-emitting device to expose a demonstrated photochromic contact lens to UV/HEV light. The photochromic contact lens demonstration device includes a cavity that is configured to receive a packaged photochromic contact lens to be demonstrated. In examples disclosed herein, the cavity is sized to be able to receive a packaged photochromic contact lens so that the photochromic contact lens is protected from damage during the demonstration and so that the contact lens does not have to be disposed of after the demonstration. The photochromic contact lens demonstration device includes a viewing window that allows one to see the contact lens when fully disposed into the cavity to show the change of the contact lens from a non-darkened to a darkened state. To cause the inserted contact lens to change from a non-darkened (e.g., clear) to a darkened state in a demonstration process, a control circuit in the photochromic contact lens demonstration device is configured to be activated that causes the UV/HEV lighting-emitting device to emit UV/HEV light to the photochromic contact lens. The cavity of the photochromic contact lens demonstration device is designed to align the contact lens with the UV/HEV light so that the contact lens is exposed to UV/HEV light when the lighting-emitting device is activated. After a period of time of exposure of the photochromic contact lens to the UV/HEV light, the photochromic contact lens will change from a non-darkened to darkened state, which can be seen through the viewing window. The control circuit of the photochromic contact lens demonstration device is also configured to deactivate the UV/HEV light after a period of time to allow the photochromic contact lens to change back to the non-darkened state to demonstrate the full changing from a non-darkened state, to a darkened state, and then back to the non-darkened state.

Generally, photochromic materials used in photochromic lenses change from a non-darkened state to a darker state more quickly when exposed to UV/HEV light at body temperature than when the photochromic material is exposed to UV/HEV light at a lower ambient temperature. In other words, the fade rate of a photochromic lens changing from a non-darkened state to a darkened state is faster when photochromic lens is at body temperature versus a lower ambient temperature. Thus, photochromic materials will also change more quickly from the darkened state back to the non-darkened state after exposure to UV/HEV light is removed at body temperature than a lower ambient temperature for a given period of time, because the photochromic material will have originally changed to a less darkened state when exposed to UV/HEV light at body temperature versus ambient temperature. However, a photochromic contact lens is not installed in a patient at body temperature during demonstration.

Thus, in other exemplary aspects disclosed herein, to simulate the photochromic contact lens being installed in a patient's eye at ocular body temperature to more quickly demonstrate the changing of a photochromic contact lenses from a darkened state back to a non-darkened state, the photochromic contact lens demonstration device can also include an optional heating circuit to heat and elevate the temperature of the photochromic contact lens during demonstration. In this regard, in examples discussed herein, the control circuit of the photochromic contact lens demonstration device can also be configured to activate a heating circuit to activate a heating element to heat the photochromic contact lens inserted into the demonstration device during a demonstration process. The heating circuit is positioned in the assembly of the photochromic contact lens demonstration device with the heating element positioned proximate to the photochromic contact lens when disposed in the cavity for effective heat transfer. The control circuit of the photochromic contact lens demonstration device is configured to activate the heating circuit before and/or during the activation of the light-emitting device to expose the photochromic contact lens to UV/HEV light. This regulates the photochromic contact lens so that it changes to a less dark state than otherwise would occur if the photochromic contact lens were not heated when exposed to UV/HEV light. This then allows the photochromic contact lens to change more quickly from the darkened state back to a non-darkened state when no longer exposed to UV/HEV light. The control circuit of the transition contact lens demonstration device may also be configured to keep the heating circuit activated after a period of time after deactivation of the light-emitting device to allow the photochromic contact lens to change more quickly from the darkened state back to the non-darkened state. The control circuit of the photochromic contact lens demonstration device is configured to deactivate the heating circuit activated after a period of time after deactivation of the light-emitting device.

FIGS. 2A-2E illustrate an example of a photochromic contact lens demonstration device 200 (also referred to as "demonstration device 200") that is capable of demonstrating the change of a photochromic contact lens from a normal, non-darkened state to a darkened state for demonstration purposes. As will be discussed in more detail below, the demonstration device 200 includes a lighting device that is under control of a control circuit to emit UV and/or HEV light to a photochromic contact lens installed in the photochromic contact lens demonstration device 200 to cause the photochromic contact lens to change from normal, non-darkened state to a darkened state. The demonstration device 200 can be configured to perform an automated demonstration process in various operating modes to expose the photochromic contact lens to UV and/or HEV light to cause the photochromic contact lens to change from normal, non-darkened state to a darkened state, and then discontinue the exposure to UV and/or HEV light that causes the change back from the darkened state to a non-darkened state.

Figure 2A:
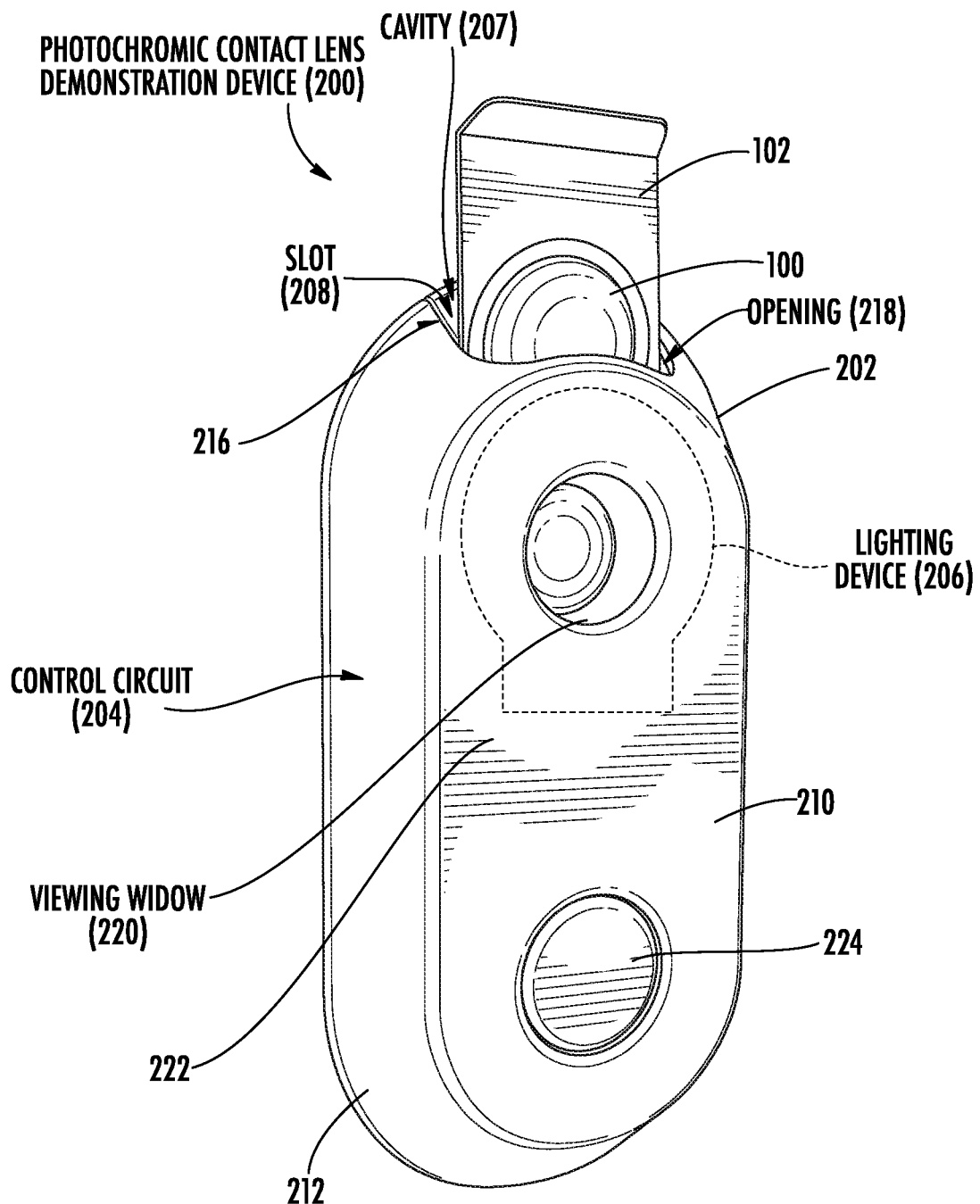
FIG. 2A is a left, side perspective view of an exemplary photochromic contact lens demonstration device that includes a cavity in the form of a slot configured to receive and position a packaged contact lens in alignment with a UV and/or HEV lighting device and viewing window and proximate a heating element of a heating circuit, wherein the photochromic contact lens demonstration device includes a control circuit configured to activate the lighting device and heating circuit to apply light and heat to the packaged contact lens to illustrate the process of a photochromic contact lens changing from a normal, non-darkened state to a darkened state.
Figure 2B:
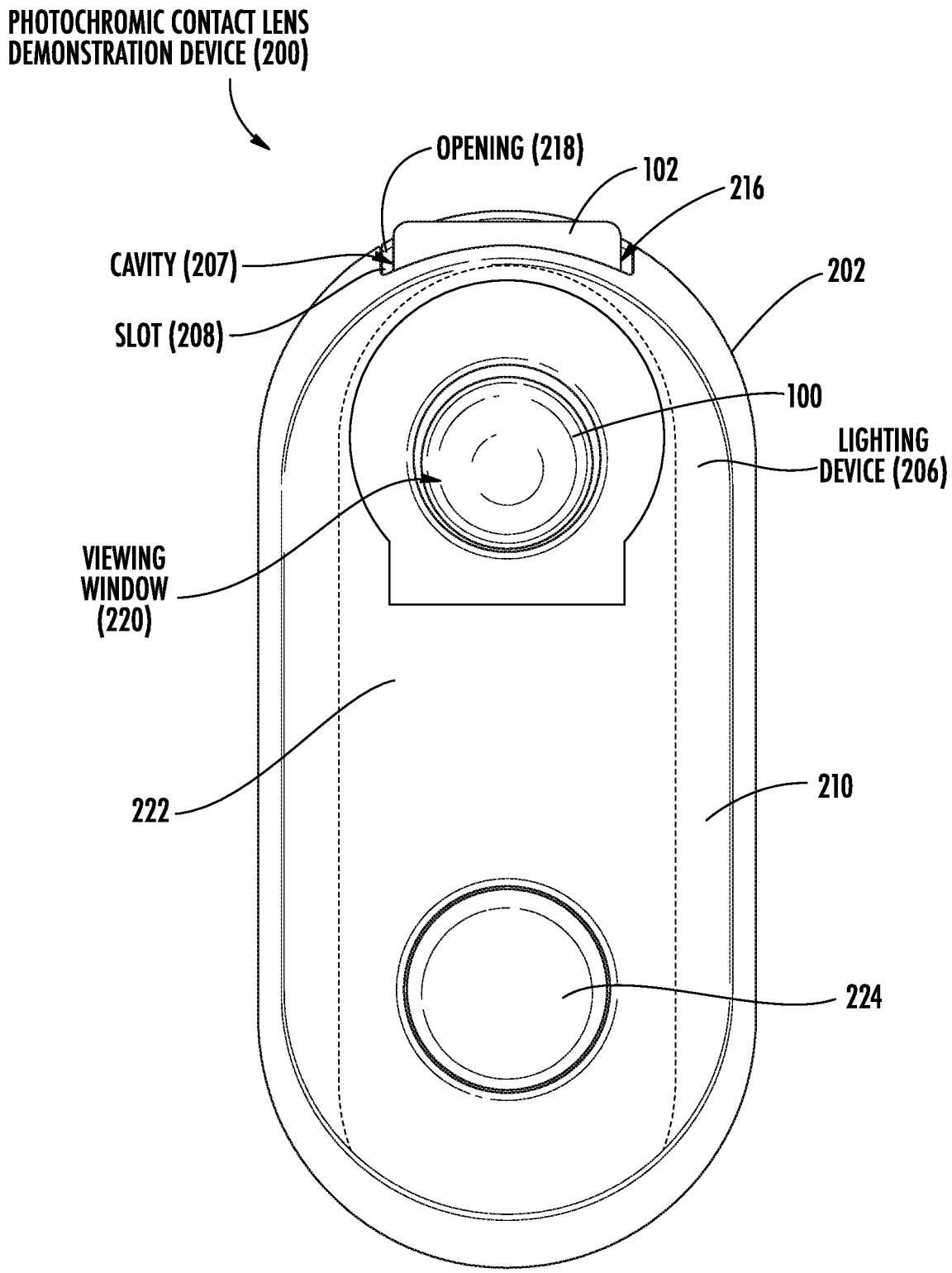
FIG. 2B is a top view of the photochromic contact lens demonstration device in FIG. 2A with a packaged contact lens fully inserted into the slot and disposed in a contact lens region of the device aligned with the lighting device and the heating element of the photochromic contact lens demonstration device.
Figure 2C:
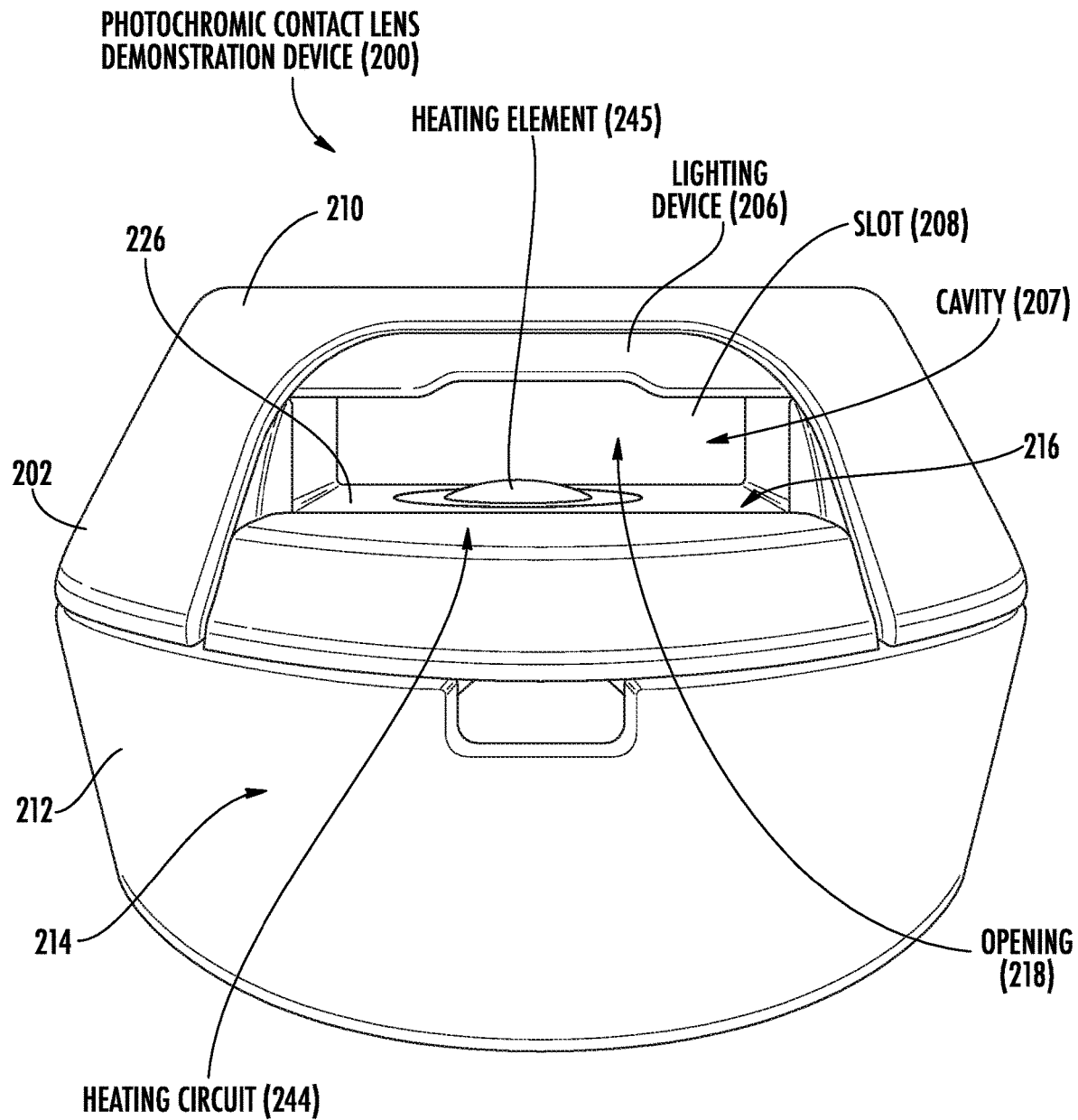
FIG. 2C is a front view of the photochromic contact lens demonstration device in FIG. 2A without a packaged contact lens inserted into the slot.

In this regard, FIG. 2A illustrates a left, side perspective view of the exemplary demonstration device 200. The demonstration device 200 includes a housing 202 that is configured to house components internally, including a control circuit 204 and lighting device 206, that are configured to carry out an automated demonstration process to expose a photochromic contact lens 100 in a contact lens package 102 to UV/HEV light to cause the photochromic contact lens 100 to change from a non-darkened state to a darkened state for demonstration purposes. As shown in FIG. 2A, a cavity 207 in the form of slot 208 in this example is disposed in the housing 202 of the demonstration device 200, which is configured to receive an inserted contact lens package 102 to be demonstrated, as shown in the top view of the demonstration device 200 in FIG. 2B. FIG. 2C is a front view of the demonstration device 200 without the contact lens package 102 inserted into the slot 208 to further illustrate the slot 208. The slot 208 is formed in a cover 210 of the housing 202 that is fixedly attached to a base 212 of the housing 202 to form an interior chamber 214 for receiving a photochromic contact lens 100 and/or a photochromic contact lens 100 in a contact lens package 102. For example, the cover 210 and base 212 may be attached together by fasteners, such as screws, or by mechanical means, such as biased members configured to engage with complementary slots. In one example, the cover 210 and base 212 form a seal that is resistant to outside liquid spills, such as saline solution. The slot 208 has a distal end 216 as shown in FIGS. 2B and 2C. The slot 208 forms an opening 218 in the cover 210 at the distal end 216 that is sized and configured to receive a contact lens package 102, as shown in FIGS. 2A-2C. As shown in FIGS. 2A and 2B, the viewing window 220, which is an opening in this example, is disposed on an outer surface 222 of the cover 210 so that the photochromic contact lens 100 in the contact lens package 102 inserted into the cavity 207 comprising the slot 208 can be viewed when fully inserted and exposed to UV/HEV light by the lighting device 206. As shown in FIGS. 2A and 2B and discussed in more detail below, the demonstration device 200 also includes an external switch 224 in the form of a button that is able to be pressed to initiate a demonstration process by the control circuit 204.

Figure 2D:
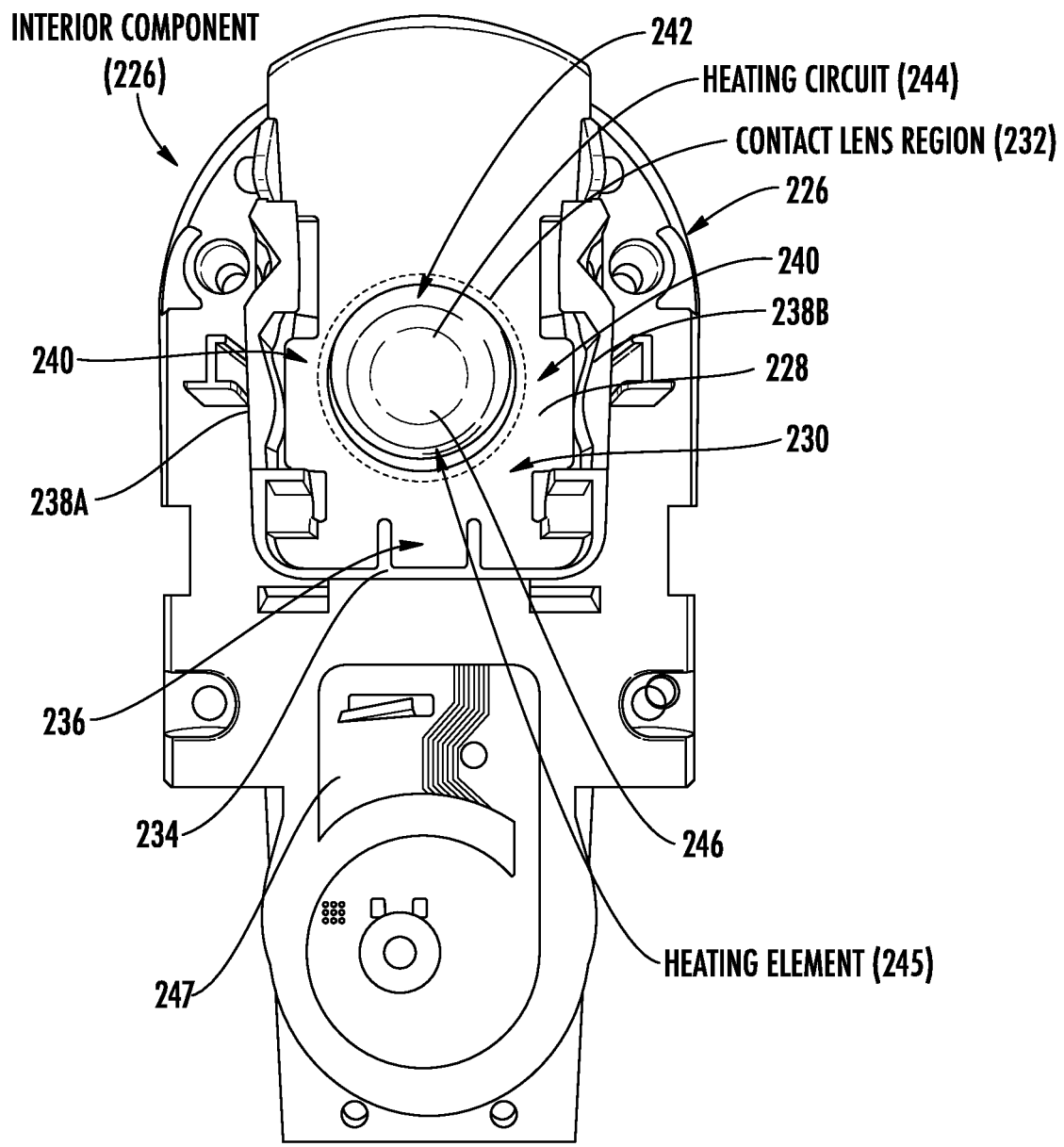
FIG. 2D is a top view of an interior component that provides an interior surface and the contact lens region thereon with an opening for a heating element to be disposed in the housing adjacent to the contact lens region.

FIG. 2D illustrates an interior component 226 that is fitted inside the interior chamber 214 of the housing 202 and forms a bottom surface 228 of the slot 208. The interior component 226 from the distal end 216 of the slot 208 is also shown in the front view of the demonstration device 200 in FIG. 2C. With reference to FIG. 2D, the interior component 226 provides an interior surface 230, which forms the bottom surface 228 of the slot 208, to provide a contact lens region 232 where a photochromic contact lens 100 will be aligned when a contact lens package 102 is fully inserted in the slot 208. The interior component 226 also includes a rear wall 234 that forms a proximal end 236 of the slot 208. Side walls 238A, 238B of the interior component 226 along with the rear wall 234 form the interior space 240 of the slot 208 in which an inserted contact lens package 102 is inserted and registered. The interior space 240 is designed so that a photochromic contact lens 100 in a contact lens package 102 fully inserted into the slot 208 is axially aligned with the contact lens region 232. The contact lens region 232 is axially aligned with the viewing window 220. Thus, the slot 208 aligns a photochromic contact lens 100 of an inserted contact lens package 102 with the viewing window 220 so that the photochromic contact lens 100 can be viewed when inserted in the demonstration device 200. As will also be discussed in more detail below, the interior component 226 also includes an opening 242 that is configured to expose an optional heating circuit 244 installed in the housing 202. The opening 242 is aligned with and below the contact lens region 232. The heating circuit 244 includes a heating element 245 that is aligned with the opening 242 and the contact lens region 232. In this manner, by the heating element 245 being located in alignment and below the contact lens region 232, a photochromic contact lens 100 in a contact lens package 102 inserted in the slot 208 is located directly above and adjacent to the heating element 245 so that the temperature around the photochromic contact lens 100 can be elevated to heat the photochromic contact lens 100 during demonstration. As previously discussed, the photochromic contact lens 100 can more quickly change from a non-darkened to darkened state at elevated temperatures when exposed UV and/or HEV light. In this example, the heating element 245 is an aluminum, dome-shaped component 246 that is configured to be coupled to electrical current under control of the control circuit 204 to generate heat. The heating circuit 244 also includes a printed circuit board (PCB) 247 that is coupled to the heating element 245 and is also interfaced with the control circuit 204.

Figure 2E:
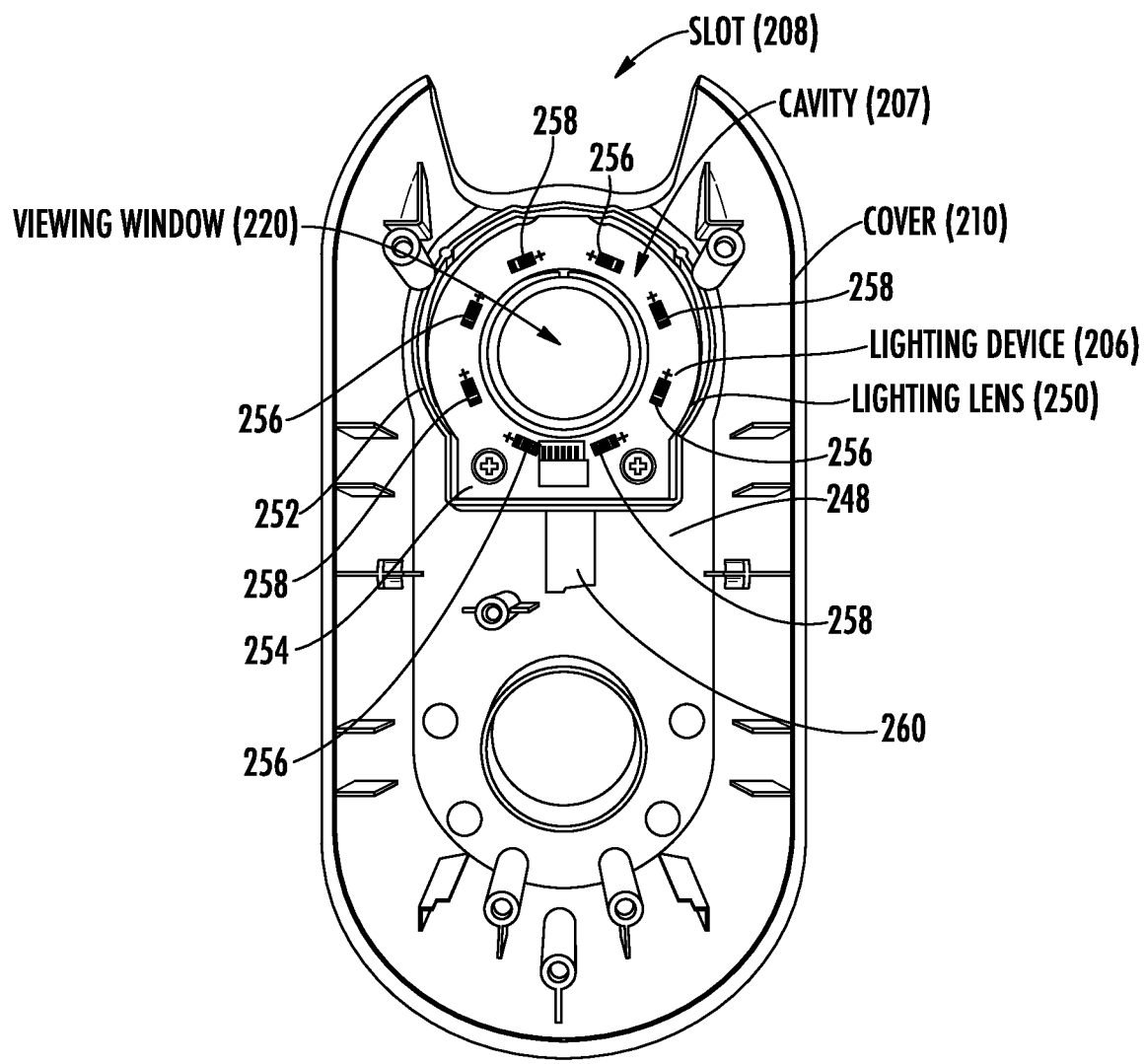
FIG. 2E is a bottom view of the cover of the housing of the photochromic contact lens demonstration device in FIG. 2A.

FIG. 2E is a bottom view of the cover 210 of the housing 202 of the photochromic contact lens demonstration device 200 in FIGS. 2A-2C to illustrate exemplary detail of the lighting device 206. As shown in FIG. 2E, in this example, the lighting device 206 is mounted to an interior surface 248 of the cover 210. In this example, the lighting device 206 is provided in the form of a lighting lens 250 that includes a translucent, circular-shaped housing 252 housing a circular-shaped PCB 254 that is formed around and adjacent to the outer edge of the viewing window 220. UV/HEV light emitting diodes (LEDs) 256 are mounted to the PCB 254. In this manner, when the UV/HEV LEDs 256 are activated by the control circuit 204, the UV/HEV LEDs 256 emit UV and/or HEV light that reaches the contact lens region 232 where a photochromic contact lens 100 is disposed when its contact lens package 102 is inserted in the slot 208 aligning its photochromic contact lens 100 to the contact lens region 232 and the viewing window 220. UV light is in the wavelength band of 10-400 nm. HEV light is in the wavelength band between 400-450 nm. For example, the UV/HEV LEDs 256 may be configured to emit light including a wavelength between 200-460 nanometers (nm), and in one example 405 nm. As will be discussed in more detail below, visible LEDs 258, such as white light LEDs, can also be mounted on the PCB 254 and coupled (e.g., through ribbon cable 260) to the control circuit 204. The visible LEDs 258 are capable to emit light in the visible spectrum. The control circuit 204 can be configured to activate the visible LEDs 258 to visibly illuminate the contact lens region 232. This may be desired to provide a visual indicator to a user of the demonstration device 200 as well as provide visible illumination in the contact lens region 232 for viewing a photochromic contact lens 100 before and after its photochromic to and from a darkened state.

Figure 3:
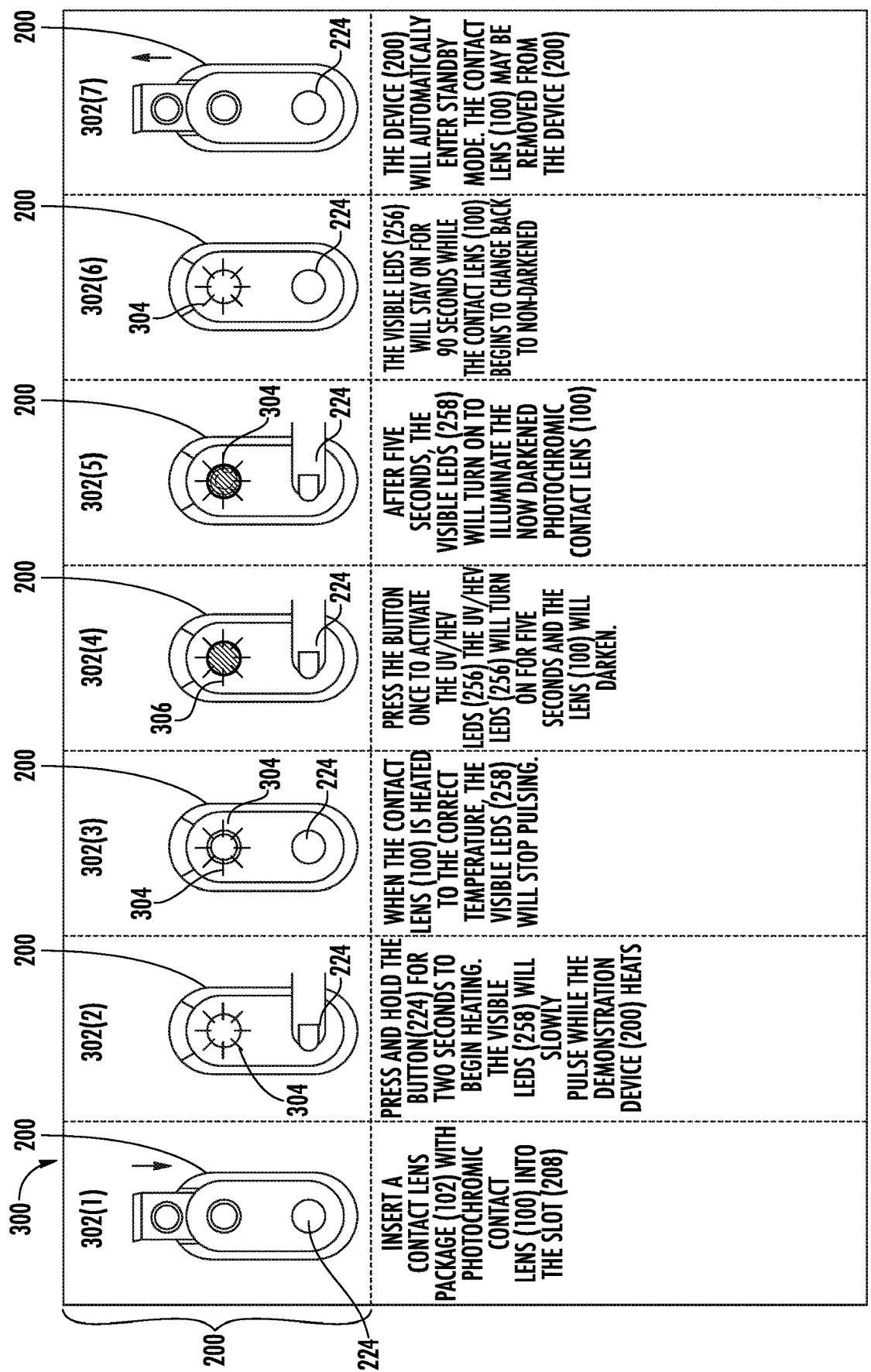
FIG. 3 is a diagram illustrating an exemplary demonstration process controlled by a control circuit in the photochromic contact lens demonstration device in FIGS. 2A-2C to demonstrate the change of a contact lens in a packaged contact lens to illuminate and heat the inserted photochromic contact lens to change from a normal, non-darkened state to a darkened state and then back to a normal, non-darkened state to demonstrate the effectiveness of a photochromic contact lens.

In this example, the UV/HEV LEDs 256 and visible LEDs 258 are arranged in an array. The UV/HEV LEDs 256 are offset from each other around the lighting lens 250 by approximately 90 degrees. This arrangement provides even distribution of the UV/HEV light emitted by the UV/HEV LEDs 256 when activated to contact lens region 232 to activate even change in the photochromic contact lens 100 from a non-darkened state to a darkened state. Likewise, the visible LEDs 258 are offset from each other around the lighting lens 250 by approximately 90 degrees. This arrangement provides even distribution of the visible LEDs 258 when activated around the lighting lens 250. This arrangement provides even distribution of the visible light emitted by the visible LEDs 258 when activated to the contact lens region 232 to evenly illuminate the photochromic contact lens 100 in the contact lens region 232. FIG. 3 is a diagram illustrating an exemplary demonstration process 300 of that the control circuit 204 of the demonstration device 200 in FIGS. 2A-2C that can be configured to demonstrate the change of the photochromic contact lens 100 inserted into the slot 208 of the demonstration device 200. More exemplary implementation details of the control circuit 204 are discussed in more detail below. The exemplary demonstration process 300 in FIG. 3 is discussed with reference to elements in the demonstration device 200 in FIGS. 2A-2E.

Figure 4A:
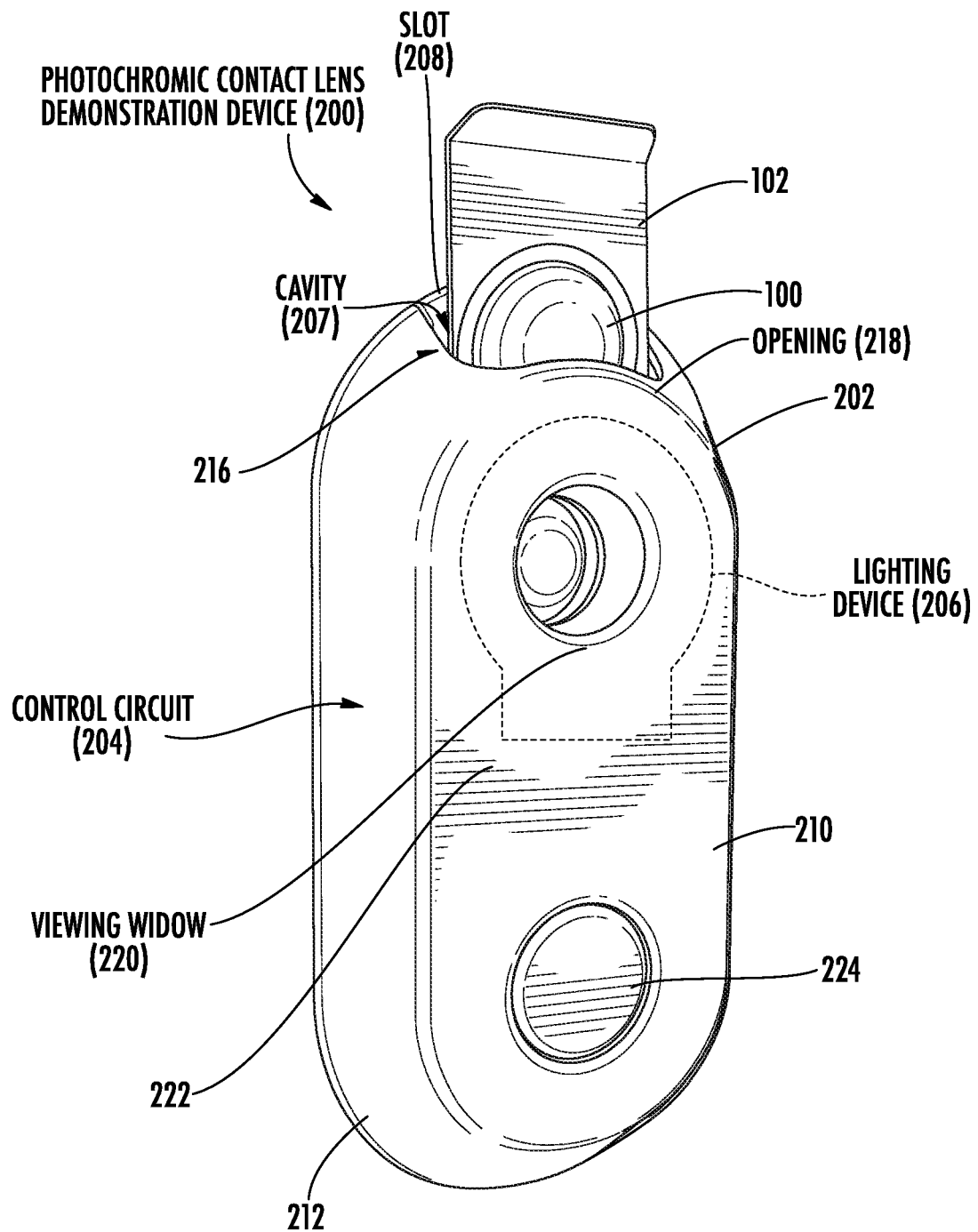
FIGS. 4A and 4B are left, top perspective views of the photochromic contact lens demonstration device in FIGS. 2A-2C in a first step of the demonstration process in FIG. 3 in a standby operating mode of the photochromic contact lens demonstration device.
Figure 4B:
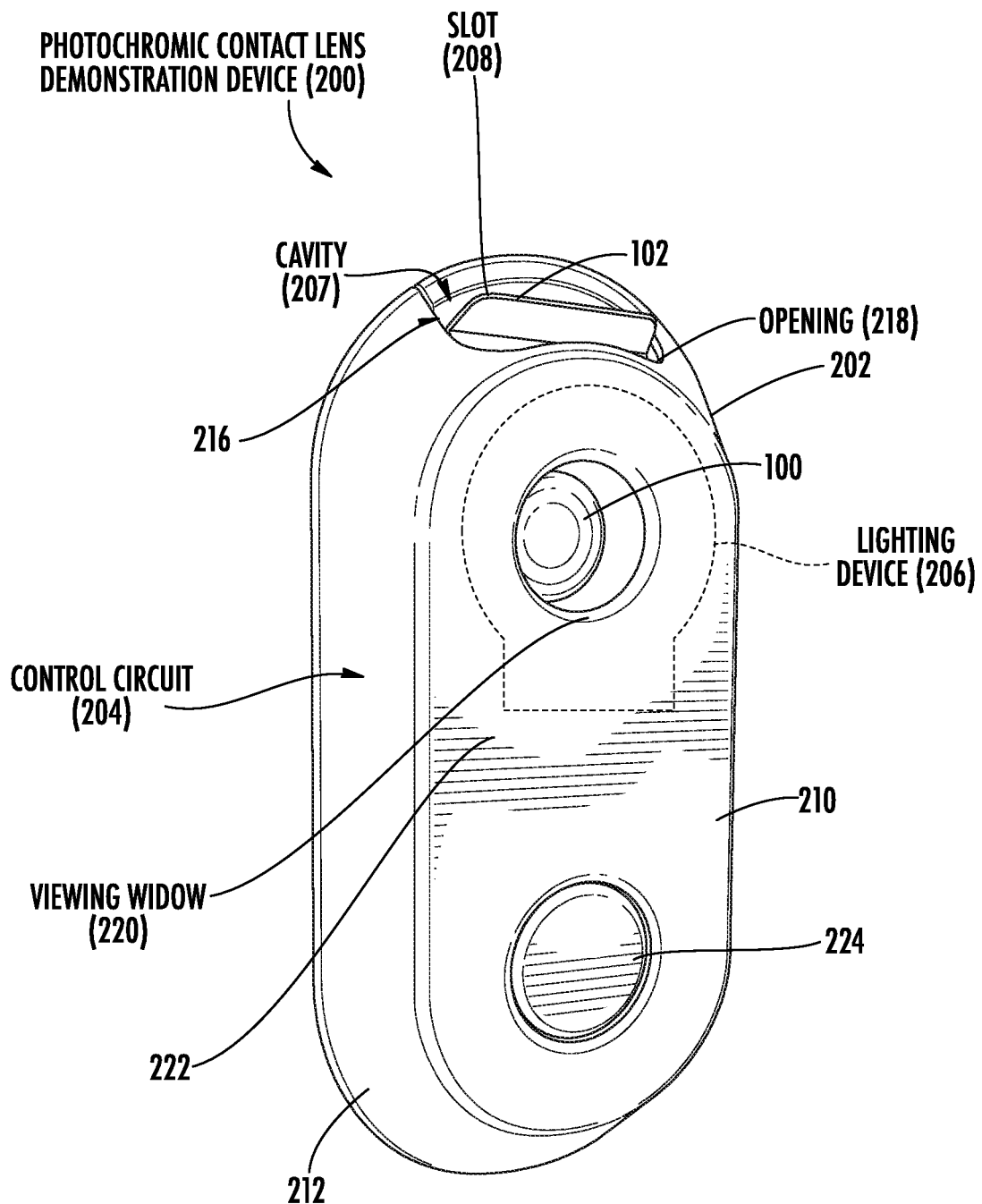

In this regard, as illustrated in FIG. 3, a first step 302(1) of the demonstration process 300 can be to insert a contact lens package 102 containing the photochromic contact lens 100 into the slot 208 of the demonstration device 200 as previously discussed and illustrated above. This step 302(1) is performed in a standby operating mode of the control circuit 204 before the control circuit 204 is activated to position the photochromic contact lens 100 in the contact lens region 232 to prepare the photochromic contact lens 100 to be exposed to UV/HEV light by the lighting device 206 to demonstrate the change of the photochromic contact lens 100. This is also illustrated in FIG. 4A, which is a left, top perspective view of the demonstration device 200 with the contact lens package 102 in the process of being inserted into the slot 208 without yet being fully inserted into the slot 208. FIG. 4B illustrates the demonstration device 200 with the contact lens package 102 fully inserted into the slot 208.

Figure 4C:
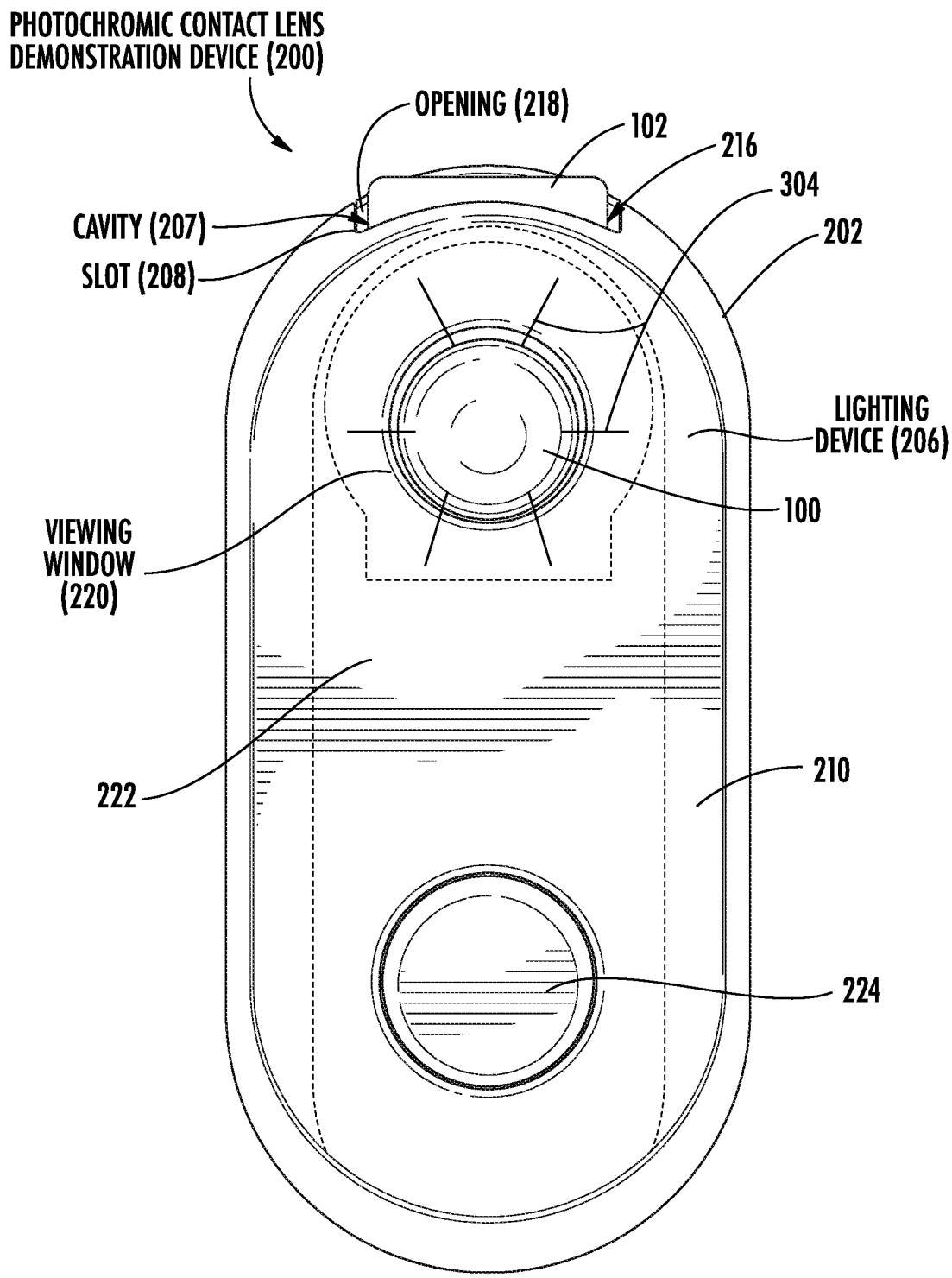
FIG. 4C is a top view of the photochromic contact lens demonstration device in FIGS. 2A-2C during visible light illumination of the packaged contact lens in a second and third step of the demonstration process in FIG. 3 to indicate a heating operating mode of the photochromic contact lens demonstration device.

With continuing reference to FIG. 3, in this example, a next step 302(2) in the demonstration process 300 can be for user to activate the switch 224 in the demonstration device 200 to cause the control circuit 204 to initiate the demonstration of the change of the inserted photochromic contact lens 100. This causes the control circuit 204 to enter into a heating operating mode from the standby operating mode. As will be discussed in more detail below, in response to activation of the switch 224, the control circuit 204 activates the visible LEDs 258 in the lighting device 206 to cause the visible LEDs 258 to emit visible light to the contact lens region 232. The control circuit 204 causes the visible LEDs 258 to emit visible (e.g. white) light 304 in this example to provide a visual indicator or feedback to the user that acknowledges the activation of the switch 224 and that the demonstration process has been initiated by the control circuit 204. This is also illustrated in FIG. 4C, which is top view of the demonstration device 200 with the contact lens package 102 fully inserted into the slot 208 and the visible light 304 being emitted by the lighting device 206. In this example, the control circuit 204 also activates the optional heating circuit 244 in response to activation of the switch 224 to couple the heating element 245 to electrical current, which will then cause the heating element 245 to generate heat and raise the temperature surrounding the contact lens region 232 including the photochromic contact lens 100 in the contact lens package 102 inserted into the slot 208. As discussed above, increasing the temperature of the photochromic contact lens 100 during demonstration will enable the fading rate of the photochromic contact lens 100 going from a darkened state to a non-darkened state to change faster. The fading rate of the photochromic contact lens 100 changing from a non-darkened state to a darkened state is the rate or speed at which the photochromic contact lens 100 changes from the non-darkened state to the darkened state. Thus, increasing the temperature of the photochromic contact lens 100 during demonstration can make demonstration of a photochromic contact lens 100 to represent on-eye performance by a doctor or other technician to potential purchaser patients more realistic.

In this example, in step 302(2) in the heating operating mode, the control circuit 204 causes the lighting device 206 to pulse the visible LEDs 258 as a visual indicator that the heating circuit 244 is active and in the process of causing the heating element 245 to generate heat to raise the temperature in the surrounding area to a defined threshold temperature programmed or pre-programmed for the control circuit 204. For example, the defined threshold temperature may be 55 degrees Celsius. In the heating operating mode, the control circuit 204 can be configured to keep the heating element 245 active for a defined initialization period or until the temperature in the surrounding area raises to the defined threshold temperature. As will be discussed in more detail below, the control circuit 204 can be configured to pulse the visible LEDs 258 until the control circuit 204 detects that the temperature has reached the defined threshold temperature. Thereafter, the control circuit 204 can regulate the heating circuit 244 to maintain the temperature in the contact lens region 232 at the defined threshold temperature as shown in step 302(3) in FIG. 3. In this example, after the temperature of the contact lens region 232 reaches the defined threshold temperature, the control circuit 204 may control the lighting device 206 to keep the visible LEDs 258 on without pulsing them as a visual indicator to a user that the temperature has reached the defined threshold voltage.

Figure 4D:
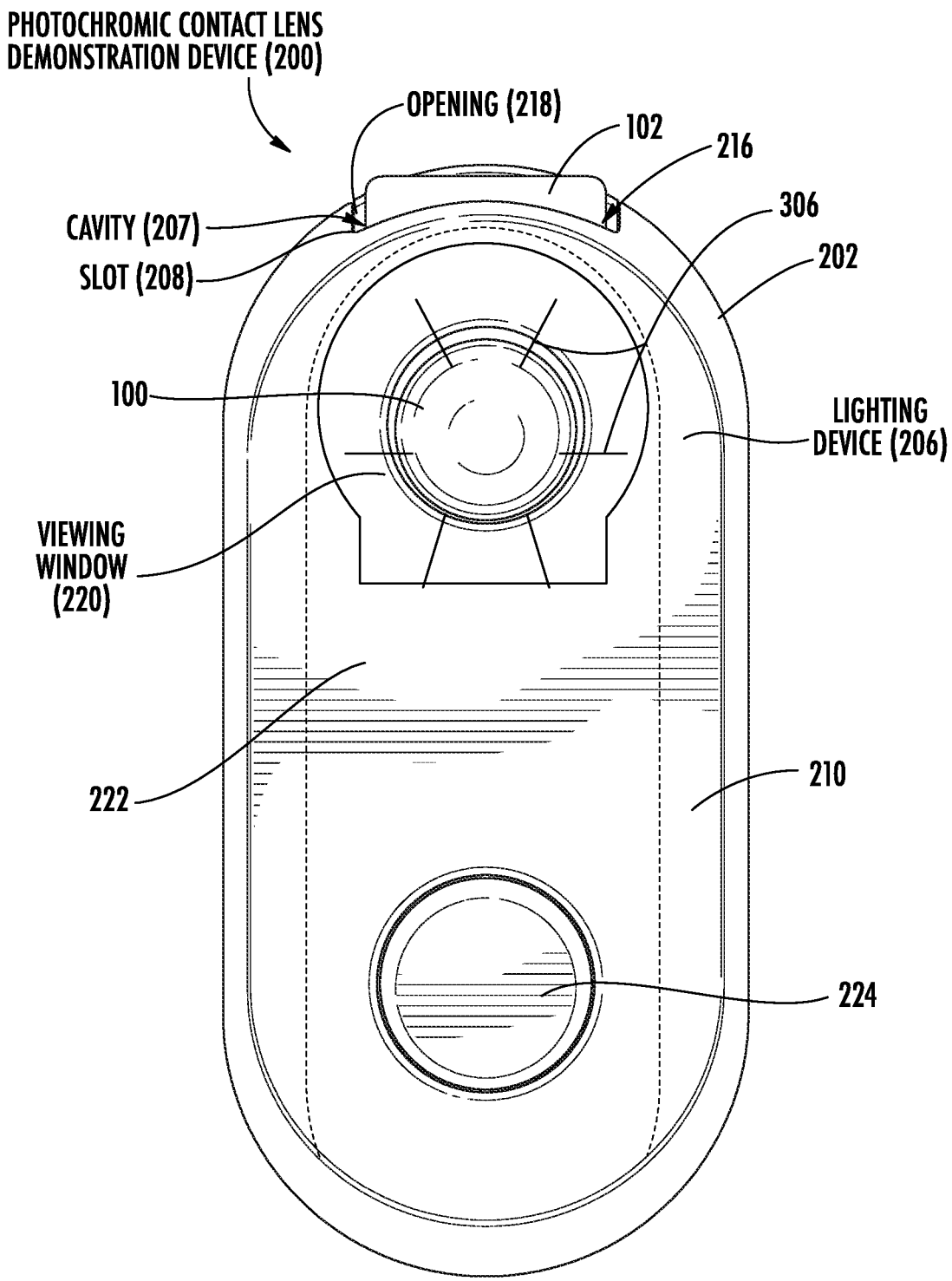
FIG. 4D is a top view of the photochromic contact lens demonstration device in FIGS. 2A-2C during UV/HEV light illumination of the packaged contact lens in a fourth step of the demonstration process in FIG. 3, in a lens demonstration operating mode of the photochromic contact lens demonstration device with the contact lens in a normal, non-darkened state.

With continuing reference to FIG. 3, after the temperature in the contact lens regions 232 has reached the defined threshold temperature in this example, the control circuit 204 can activate the lighting device 206 to deactivate the visible LEDs 258 and activate the UV/HEV LEDs 256 in a lens demonstration operating mode. The UV/HEV LEDs 256 when activated illuminate the contact lens regions 232 with UV/HEV light. In this example, the control circuit 204 can enter the lens demonstration operating mode thereby deactivating the visible LEDs 258 and activating the UV/HEV LEDs 256 to emit UV/HEV light 306 to the contact lens region 232 in response to another single activation/re-activation of the switch 224 by a user after the temperature of the contact lens region 232 reaches the defined threshold temperature and is being maintained. This is also illustrated in FIG. 4D, which is top view of the demonstration device 200 with the contact lens package 102 fully inserted into the slot 208 and the UV/HEV light 306 being emitted by the lighting device 206 to the contact lens region 232 to expose the photochromic contact lens 100 to the UV/HEV light 306. As previously discussed, exposing the photochromic contact lens 100 to UV/HEV light 306 causes the photochromic contact lens 100 to change from a non-darkened state to a darkened state. In the lens demonstration operating mode, in this example step 302(4), the control circuit 204 will continue to control the heating circuit 244 to cause the temperature in the contact lens regions 232 to be maintained to the defined threshold temperature to simulate the photochromic contact lens 100 being installed in a human eye at ocular body temperature. As previously discussed, the fade rate of the photochromic contact lens 100 transitioning from the non-darkened state to the darkened state at higher temperatures (e.g., body temperature) will be less than the fade rate of the photochromic contact lens 100 transitioning from the non-darkened state to the darkened state at lower temperatures (e.g., ambient temperature). Thus, maintaining the elevated temperature of the photochromic contact lens 100 will allow the photochromic contact lens 100 to change back from a darkened state to a non-darkened state faster once the photochromic contact lens 100 is no longer exposed to the UV/HEV light 306. If after the temperature in the contact lens regions 232 has reached the defined threshold temperature in the heating operating mode, the user does not activate/re-activate the switch 224 within a defined period of time (e.g., 90 seconds), the control circuit 204 will return the demonstration device 200 back to the standby operation mode in step 302(1) ready to enter the heating operating mode when the switch 224 is activated.

Figure 4E:
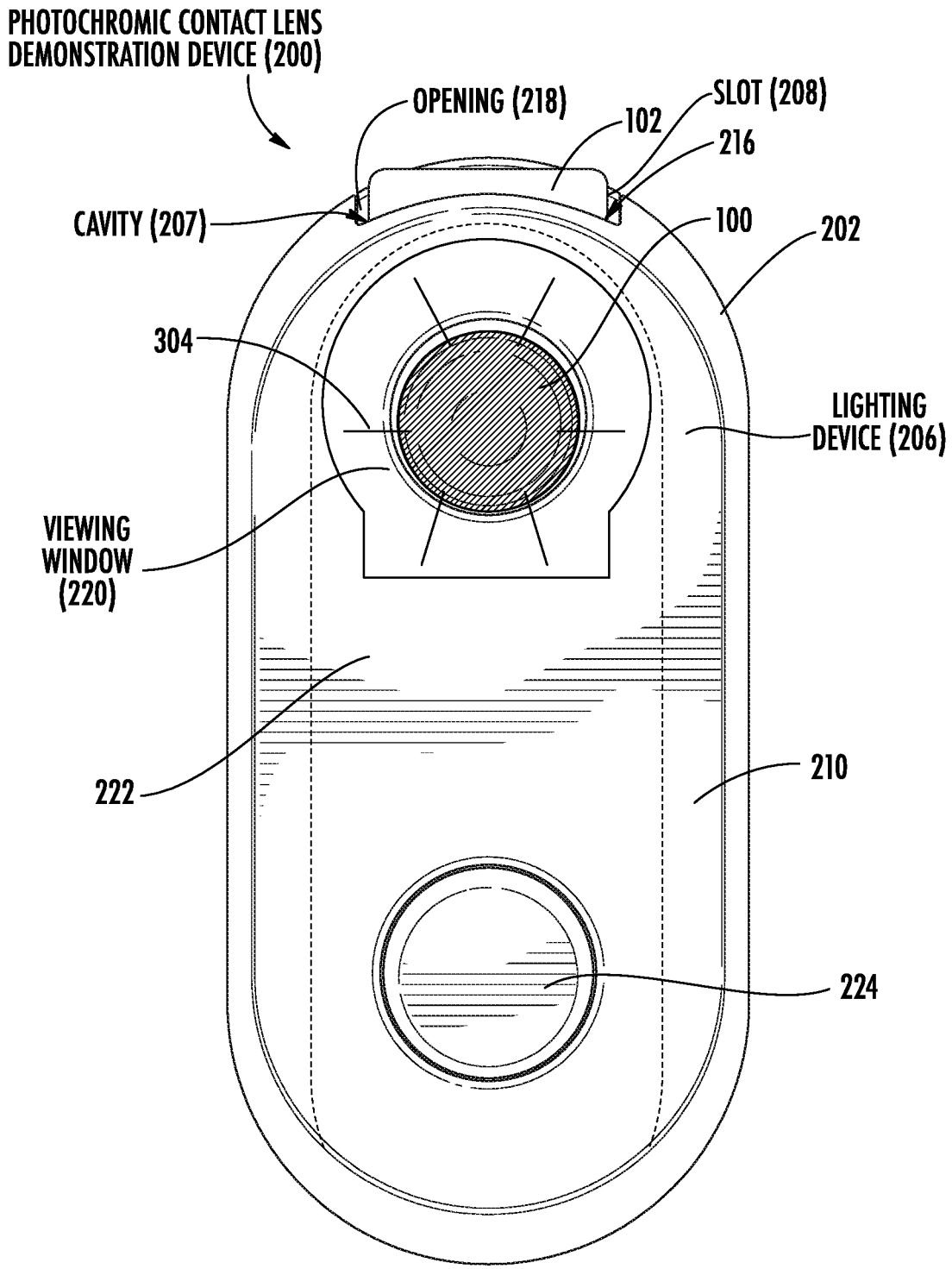
FIG. 4E is a top view of the photochromic contact lens demonstration device in FIGS. 2A-2C during UV/HEV light illumination of the packaged contact lens in a fifth step of the demonstration process in FIG. 3, in a lens demonstration operating mode of the photochromic contact lens demonstration device with the contact lens in a darkened state.

With continuing reference to FIG. 3, after a defined demonstration time period (e.g., 5 seconds) of the control circuit 204 activating the lighting device 206 to activate the UV/HEV LEDs 256 to emit the UV/HEV light 306 to the contact lens region 232 exposing the photochromic contact lens 100 to the UV/HEV light 306 in the lens demonstration operating mode, the photochromic contact lens 100 will change from a non-darkened to a darkened state. This is also illustrated in FIG. 4E, which is top view of the demonstration device 200 with the photochromic contact lens 100 in a darkened state. The defined demonstration time can be selected and/or programmed for the control circuit 204 based on empirical understanding of how long it takes for the photochromic contact lens 100 to change from a non-darkened to a darkened state based on the exposure to the UV/HEV LEDs 256 at the defined threshold temperature. Then, in step 302(5), the control circuit 204 may then be configured to cause the lighting device 206 to deactivate the UV/HEV LEDs 256 and re-activate the visible LEDs 258 in the lighting device 206 to show the user the photochromic contact lens 100 in a darkened state with the visible light 304 for viewing. The control circuit 204 can be programmed to maintain activation of the visible LEDs 258 for a defined period of time (e.g., 90 seconds) while the photochromic contact lens 100 begins to change back from the darkened state to the non-darkened state as a result of not being exposed to the UV/HEV light 306. In this example lens demonstration operating mode, the control circuit 204 continues to activate the heating circuit 244 to maintain the temperature in the contact lens region 232 and the photochromic contact lens 100 at the defined threshold temperature so that the photochromic contact lens 100 will change back to the non-darkened state more quickly than if at ambient temperature. The control circuit 204 can also be optionally configured to restart the demonstration process 300 by going back to step 302(4) and repeating the lens demonstration operating mode steps by a different activation of the switch 224, such as activation of the switch 224 twice.

With continuing reference to FIG. 3, after the defined period of time (e.g., 90 seconds) has passed after the control circuit 204 deactivates the UV/HEV LEDs 256 and re-activates the visible LEDs 258 in the lighting device 206 in step 302(6) in the lens demonstration operating mode, the control circuit 204 can be configured to go back into a standby operating mode as shown in step 302(7). In the standby operating mode, the control circuit 204 deactivates the visible LEDs 258 in the lighting device 206. The user would then normally remove the photochromic contact lens 100 from the slot 208; however, the user is not impeded from removing the photochromic contact lens 100 from the slot 208 in any operating mode in this example. Further, in this example, the user can cancel the demonstration process 300 thereby causing the control circuit 204 to enter into the standby operating mode at any time or step in the demonstration process 300 by continuously activating the switch 224 for a defined period of time (e.g., 5 seconds) that is distinguishable from a momentary activation.

Figure 5:
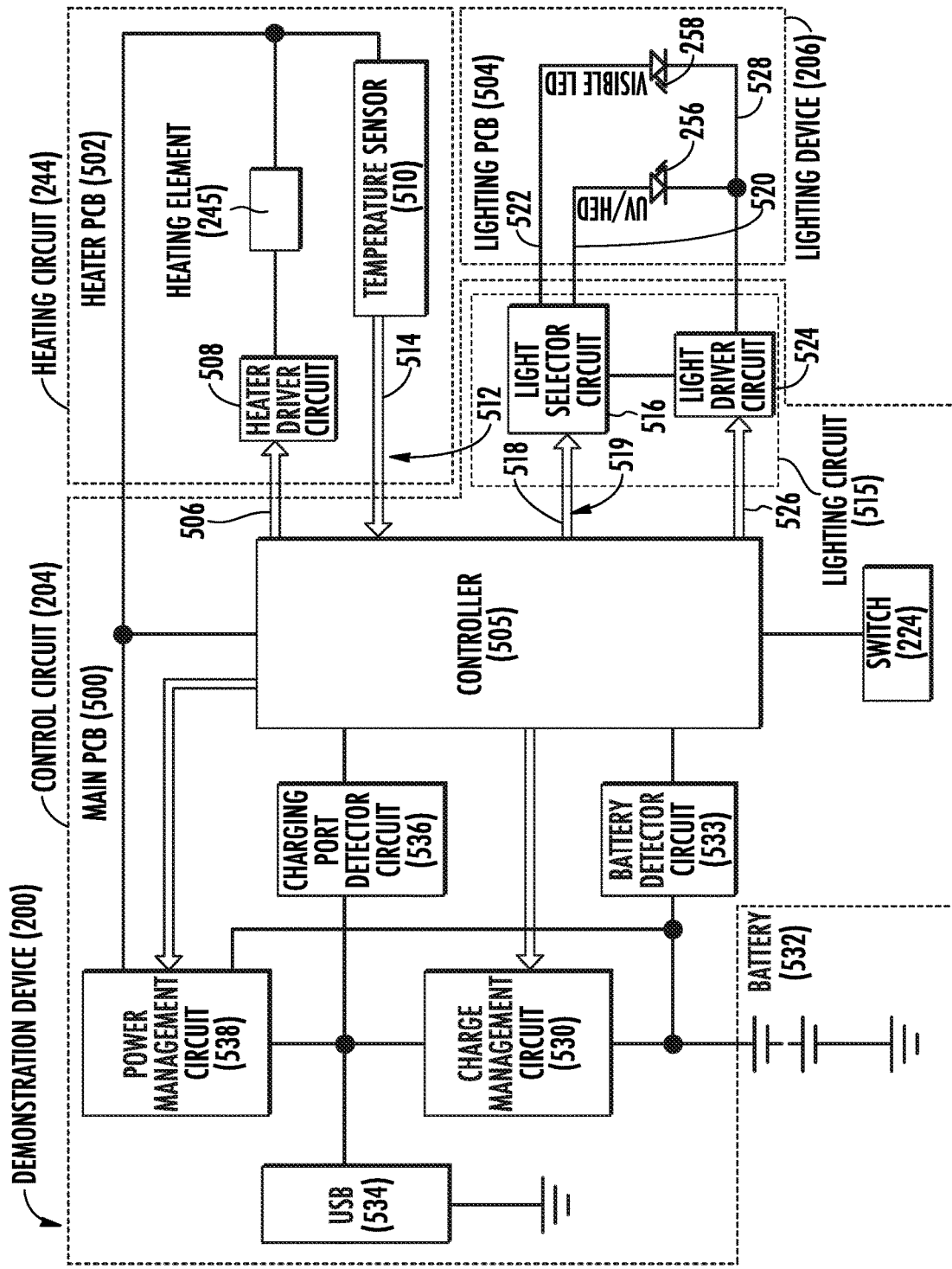
FIG. 5 is an electrical schematic diagram of the photochromic contact lens demonstration device in FIGS. 2A-2C that includes a control circuit coupled to a lighting device configured to emit UV/HEV and/or visible light and a heating circuit interfaced to a heating element, wherein the control circuit is configured to execute a state machine to perform the demonstration process in FIG. 3 and to instruct the heating circuit to control the heating element and instruct the lighting circuit to control the emission of UV/HEV and/or visible light.

FIG. 5 is an electrical schematic diagram of the demonstration device 200 in FIGS. 2A-2C that includes the control circuit 204, the heating circuit 244, and the lighting device 206 to further illustrate and explain exemplary details of these circuits and/or their components. In this regard, the control circuit 204 in this example is provided on a main PCB 500 separate from a heater PCB 502 that has the heating circuit 244 and its heating element 245 and a lighting PCB 504 that supports the lighting device 206. The control circuit 204 includes a controller 505, which may be a processor, microprocessor, field programmable gate array (FPGA), or other controller circuit. The control circuit 204 is coupled to the heating circuit 244 through a first interface 506, and more particularly to a heater driver circuit 508. The heater driver circuit 508 is configured to receive signals over the first interface 506 from the control circuit 204 indicating whether the heater driver circuit 508 is to activate (energize) or deactivate (not energize) the heating element 245. As previously discussed, the control circuit 204 instructs the heater driver circuit 508 to activate the heating element 245 in a heating operating mode to generate heat in the contact lens region 232 of the demonstration device 200 thus elevating the temperature of the photochromic contact lens 100. The heating circuit 244 in this example also includes a temperature sensor 510, which may be a thermistor for example. The temperature sensor 510 is configured to sense the temperature in its surrounding area, which in this example is the contact lens region 232, and generate a temperature signal 512 over a second interface 514 representing the temperature in the contact lens region 232. The controller 505 is configured to measure the temperature sensed by the temperature sensor 510 based on the temperature signal 512. As previously discussed, the controller 505 can then regulate the temperature by activating the heater driver circuit 508 when the measured temperature is below a desired defined temperature threshold and deactivate the heater driver circuit 508 when the measured temperature is above the desired defined temperature threshold.

Figure 6:
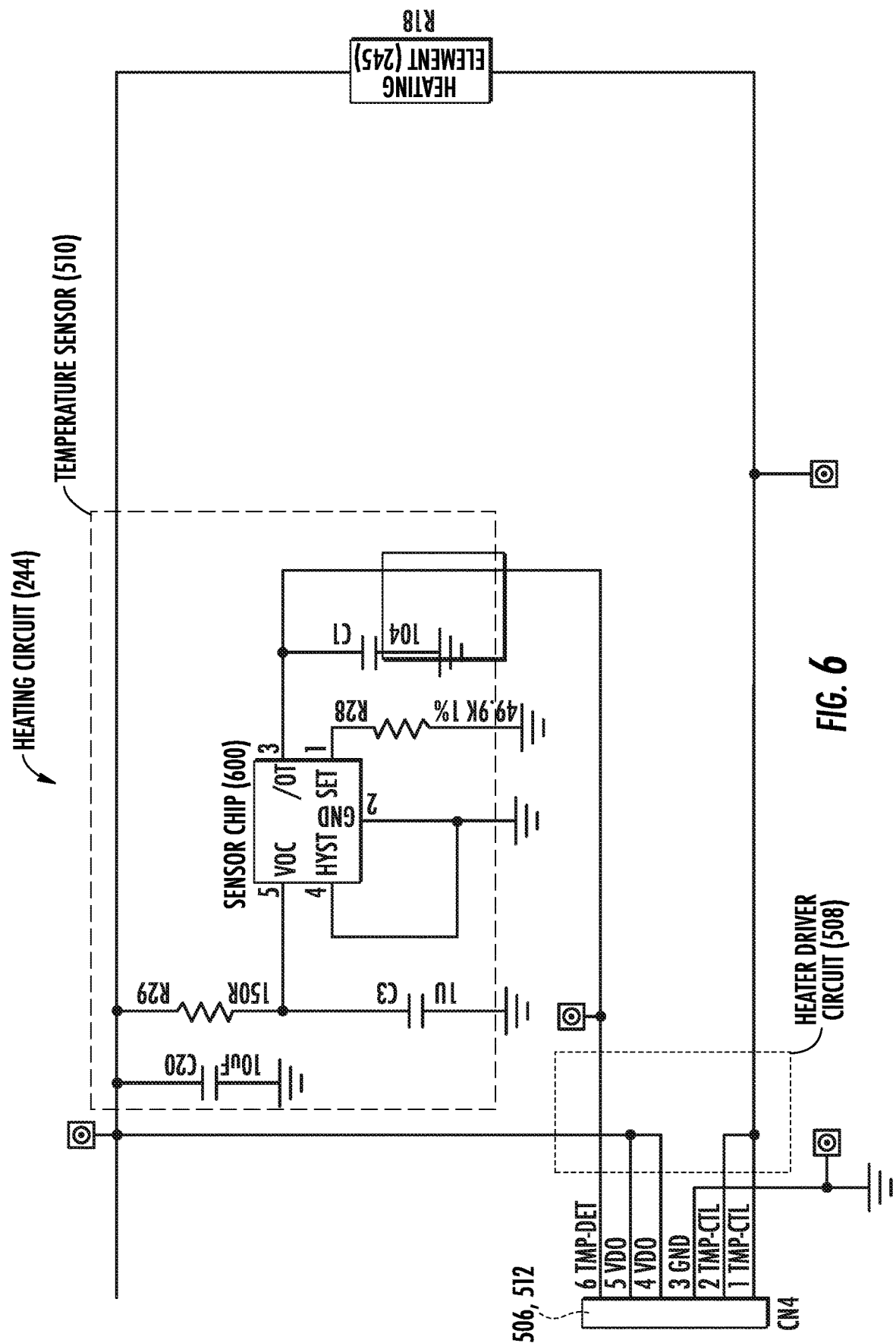
FIG. 6 is a more detailed, exemplary electrical schematic diagram of a heating circuit that can be employed as the heating circuit in FIG. 5.

FIG. 6 is a more detailed, exemplary electrical schematic diagram of the heating circuit 244 in the demonstration device 200 illustrated in FIG. 5. As shown in FIG. 6, the interface 506 includes two temperature control pins tied together 1 TMP-CTL and 2 TMP-CTL that are configured to carry a signal from the controller 505 to activate and deactivate the heater driver circuit 508. A signal that causes a voltage differential between pin 5 VDO and pins 1/2 to be applied across the heating element 245 to cause current to flow across the heating element 245 is an activation of the heating element 245. A signal that does not cause a voltage differential between pin 5 VDO and pins 1/2 to be applied across the heating element 245 to not cause current to flow across the heating element 245 is a deactivation of the heating element 245. Also, FIG. 6 illustrates the temperature sensor 510 in the heating circuit 244. The temperature sensor 510 in this example includes a sensor chip 600, which may be the Texas Instruments TMP709-Q1 chip. Values for passive elements, that include the shown resistors and capacitors, are chosen to configure the threshold temperature for the temperature sensor 510 in this example such that the temperature sensor 510 generates a temperature signal 512 on pin 6 TMP-DET representing the temperature. The temperature sensor 510 may be configured to generate the temperature signal 512 as a binary signal that indicates the temperature is above or below the defined temperature threshold, or an analog value indicating the detected temperature level, which can then be processed by the controller 505 as either exceeding or not exceeding a defined temperature threshold.

With reference back to FIG. 5, the control circuit 204 also interfaces with the lighting device 206 through a lighting circuit 515. The controller 505 of the control circuit 204 interfaces with the lighting circuit 515, which is interfaced with the lighting device 206 that includes both UV/HEV LEDs 256 and visible LEDs 258 in this example. The lighting circuit 515 in this example includes a light selector circuit 516 that is interfaced to the controller 505 over interface 518. The light selector circuit 516 is configured to activate either the UV/HEV LEDs 256 or the visible LEDs 258 in the lighting device 206 based on a light selection signal 519 provided by the controller 505. The light selector circuit 516 includes an interface 520 to the UV/HEV LEDs 256 and an interface 522 to the visible LEDs 258. The lighting circuit 515 also includes a light driver circuit 524 that is coupled over interface 526 to the controller 505 and interface 528 to the lighting device 206. To activate the UV/HEV LEDs 256 in the lighting device 206, the controller 505 sends a signal over the interface 518 to the light selector circuit 516 to instruction the light selector circuit 516 to activate either interface 520 or 522 to couple power provided by the light driver circuit 524 over interface 526 to either the UV/HEV LEDs 256 or the visible LEDs 258. In the exemplary demonstration device 200 as discussed in the demonstration process in FIG. 3, the UV/HEV LEDs 256 and the visible LEDs 258 are not designed to be activated at the same time. As previously discussed, the controller 505 is configured to activate and deactivate the UV/HEV LEDs 256 and visible LEDs 258 in the lighting device 206 based on the operating mode of the demonstration device 200. For example, the light driver circuit 524 could be the Diodes Inc. AP3156 chip.

Figure 7:
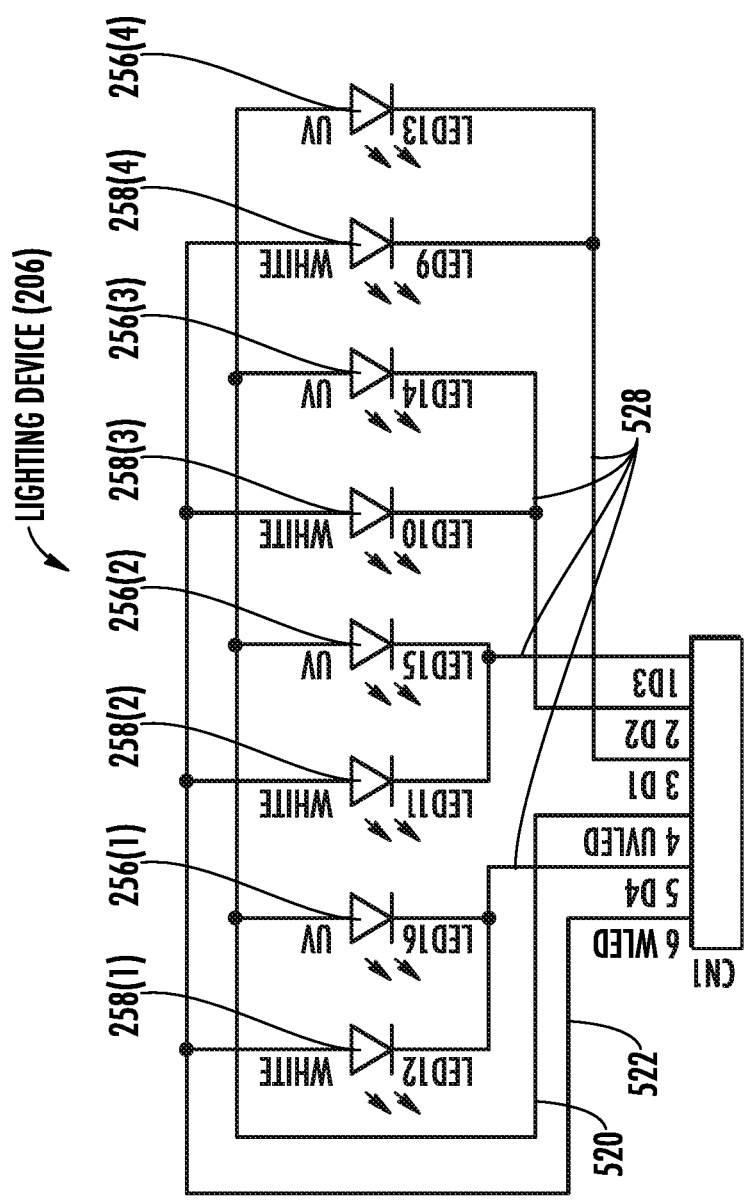
FIG. 7 is a more detailed, exemplary schematic diagram of a lighting circuit that can be employed as the lighting device in FIG. 5.

FIG. 7 is a more detailed, exemplary schematic diagram of a lighting device 206 that is interfaced to the lighting circuit 515 in FIG. 5. As shown therein, four (4) UV/HEV LEDs 256(1)-256(4) and four (4) visible LEDs 258(1)-258(4) are provided in the lighting device 206 in this example. As previously discussed and shown in FIG. 2E, the lighting device 206 and the UV/HEV LEDs 256 and visible LEDs 258 are provided in the lighting lens 250 in the demonstration device 200. The interface 520 between the light selector circuit 516 and the UV/HEV LEDs 256, the interface 522 between the light selector circuit 516 and the visible LEDs 258, and the interface 528 between the light driver circuit 524 and the lighting device 206 are shown in FIG. 7.

With reference back to FIG. 5, in this example, the control circuit 204 also includes a charge management circuit 530 that is coupled to a battery 532 to control charging of the battery 532. The battery 532 may be a rechargeable battery. The controller 505 is configured to instruct the charge management circuit 530 to charge the battery 532. The controller 505 interfaces with a battery detector circuit 533 that is coupled to the battery 532 and is configured to detect a battery condition of the battery 532, such as a voltage. When the battery 532 is fully charged, the controller 505 instructs the charge management circuit 530 to discontinue charging of the battery 532. The charge management circuit 530 is coupled to a battery charging port 534, which is a universal serial bus (USB) port in this example. A power charging cable (not shown) is configured to be connected to the battery charging port 534 to provide power for charging the battery 532 under control of the charge management circuit 530. The controller 505 also interfaces with a charging port detector circuit 536 that is configured to detect when a charging cable is connected to the battery charging port 534, and then instruct the charge management circuit 530 to charge the battery 532 based on the power received over the battery charging port 534 if the battery 532 is not already fully charged as detected by the battery detector circuit 533. The control circuit 204 also includes a power management circuit 538 that is interfaced to the controller 505 and that controls the distribution of power from the battery 532 to the power-consuming components of the control circuit 204, the heating circuit 244, the lighting circuit 515, and the lighting device 206.

As also shown in FIG. 5, the switch 224 is provided and is interfaced to the controller 505. The controller 505 is configured to detect when the switch 224 is activated by a user press, and also configured to detect the duration of the activation.

Figure 8:
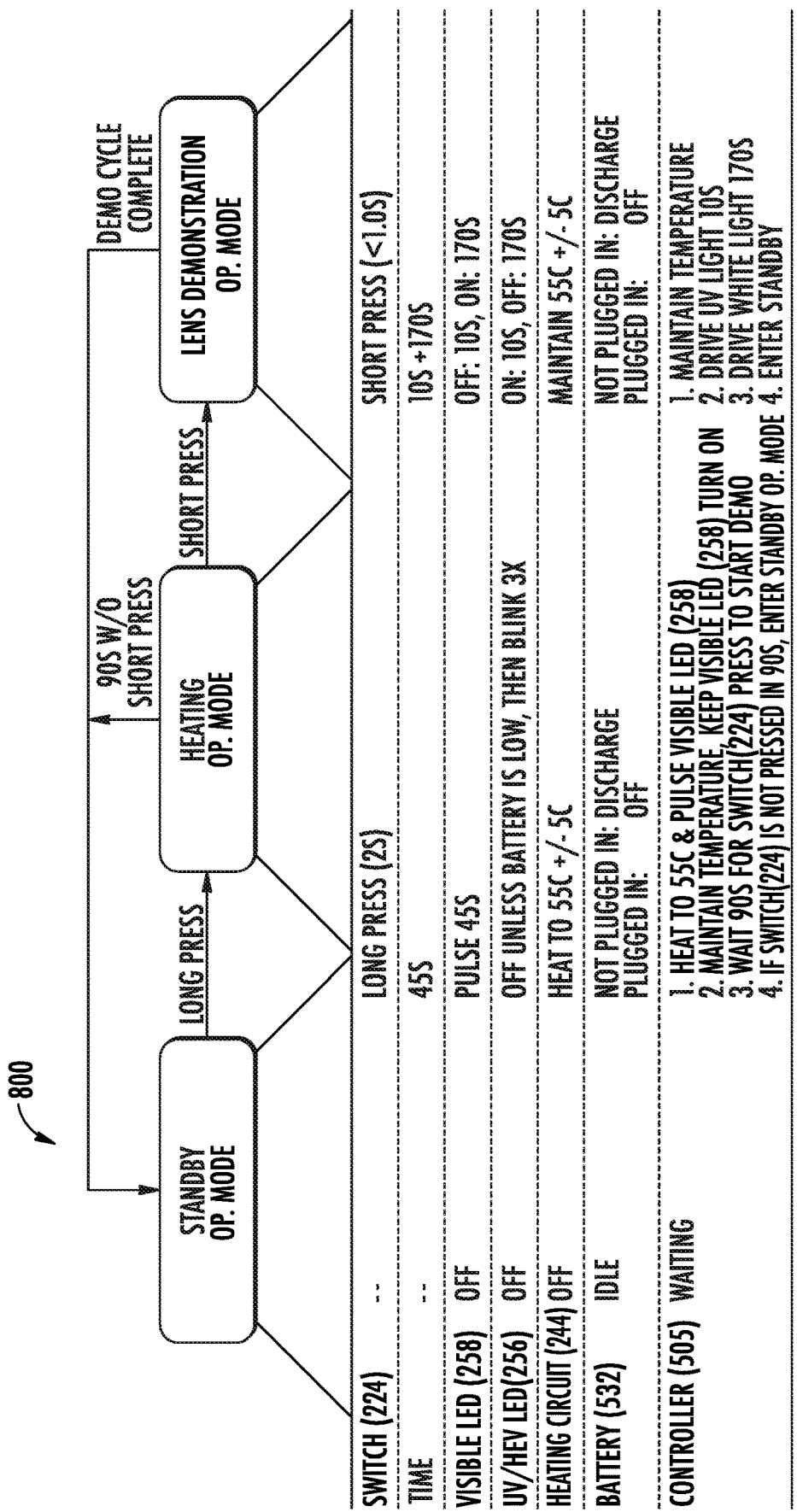
FIG. 8 is a chart illustrating exemplary operating modes of the demonstration process of the photochromic contact lens demonstration device in FIG. 3, and the state of various devices in the photochromic contact lens demonstration device in each operating mode.

FIG. 8 is a chart 800 illustrating exemplary operating modes of the demonstration process 300 of the demonstration device 200 as illustrated in FIG. 3 and described, with the state of various devices in the demonstration device 200 described in FIG. 5 for each operating mode to further explain the interactions between the controller 505 and these various devices. In this regard, in the standby operating mode, the switch 224 is deactivated. The control circuit 204 deactivates the UV/HEV LEDs 256 and visible LEDs 258 in the lighting device 206 in an OFF state. The control circuit 204 causes the heating circuit 244 to deactivate the heating element 245 in an OFF state. The battery 532 is in an idle state where enough power is being drawn for the controller 505 to detect an activation of the switch 224. The controller 505 is in a waiting mode to detect activation of the switch 224.

With continuing reference to FIG. 8, in response to detection of the activation of the switch 224 (e.g., at least a 2 second activation), the controller 505 enters the heating operating mode and is configured to instruct the lighting circuit 515 to activate the visible LEDs 258 of the lighting device 206 to pulse based on a defined time. The controller 505 is configured to instruct the lighting circuit 515 to not activate the UV/HEV LEDs 256 of the lighting device 206 unless the battery 532 is detected in a lower power condition by the controller 505, in which case, the controller 505 is configured to instruct the lighting circuit 515 to pulse the visible LEDs 258 of the lighting device 206 at a faster rate (e.g., 3×) than the normal pulse rate when the battery 532 is not detected in a lower power condition. The controller 505 is configured to instruct the heating circuit 244 to activate the heating element 245 to generate heat in the contact lens region 232 to obtain a temperature at the defined temperature threshold (e.g., 55 degrees Celsius+/−5 degrees Celsius). The control circuit 204 may be configured to control the heating circuit 244 to cause the heating element 225 to raise to a temperature of at least 35 degrees Celsius (e.g., 35 degrees Celsius+/−2 degrees Celsius), and preferably in the range of 48-57 degrees Celsius.

If the battery charging port 534 is not connected to power, the charge management circuit 530 allows the battery 532 to discharge power, otherwise, the charge management circuit 530 is not activated such that the battery 532 is not charged. The controller 505 instructs the heating circuit 244 to control the heating element 245 to maintain the temperature at the defined temperature threshold (e.g., 55 degrees Celsius+/−5 degrees Celsius) while the visible LEDs 258 are being pulsed. When the temperature reaches the defined temperature threshold, the controller 505 is configured to instruct the lighting circuit 515 to keep the visible LEDs 258 activated and not pulsed. The controller 505 then waits to detect another activation of the switch 224 within a defined time period (e.g., 90 seconds), which when detected will cause the controller 505 to enter the lens demonstration operating mode. If the controller 505 does detect another activation of the switch 224 within the defined time period, the controller 505 returns back to the standby operating mode.

With continuing reference to FIG. 8, in the lens demonstration operating mode, the switch 224 is detected by the controller 505 to have been activated (e.g., <1 second). The controller 505 is configured to instruct the lighting circuit 515 to activate the UV/HEV LEDs 256 of the lighting device 206 for a defined period of time to cause the photochromic contact lens 100 to change to a darkened state (e.g., 10 seconds), followed by deactivation the UV/HEV LEDs 256 and activation of the visible LEDs 258 for a defined period of time (e.g., 170 seconds), after which the controller 505 enters the standby operating mode. The controller 505 instructs the heating circuit 244 to control the heating element 245 to maintain the temperature at the defined temperature threshold (e.g., 55 degrees Celsius+/−5 degrees Celsius) while the UV/HEV LEDs 256 of the lighting device 206 are activated, and then also while the visible LEDs 258 are activated thereafter. If the battery charging port 534 is not connected to power, the charge management circuit 530 allows the battery 532 to discharge power, otherwise, the charge management circuit 530 is not activated such that the battery 532 is not charged.

FIG. 9 is a chart 900 illustrating exemplary states of the lighting device 206 in the demonstration device 200 in FIGS. 2A-2C during the various operating modes in the demonstration process 300 in FIG. 3. As shown in FIG. 9, in the standby operating mode, the controller 505 instruct the lighting circuit 515 to deactivate the UV/HEV LEDs 256 and the visible LEDs 258 in an OFF state. In the heating operating mode, the controller 505 instructs the lighting circuit 515 to pulse the visible LEDs 258 while the UV/HEV LEDs 256 remain in the OFF state while the heating element 245 is generating heat during heating before the temperature of the contact lens region 232 reaches the defined temperature threshold. Thereafter, when a constant temperature is reached, controller 505 instruct the lighting circuit 515 to keep the visible LEDs 258 in a constant ON state, while the UV/HEV LEDs 256s still remain OFF. Then, in the lens demonstration operating mode, the controller 505 is configured to instruct the lighting circuit 515 to activate the UV/HEV LEDs 256 of the lighting device 206 for a defined period of time to cause the photochromic contact lens 100 to change to a darkened state (e.g., 10 seconds), followed by deactivation the UV/HEV LEDs 256 and activation of the visible LEDs 258 for a defined period of time (e.g., 170 seconds).

Figure 10A:
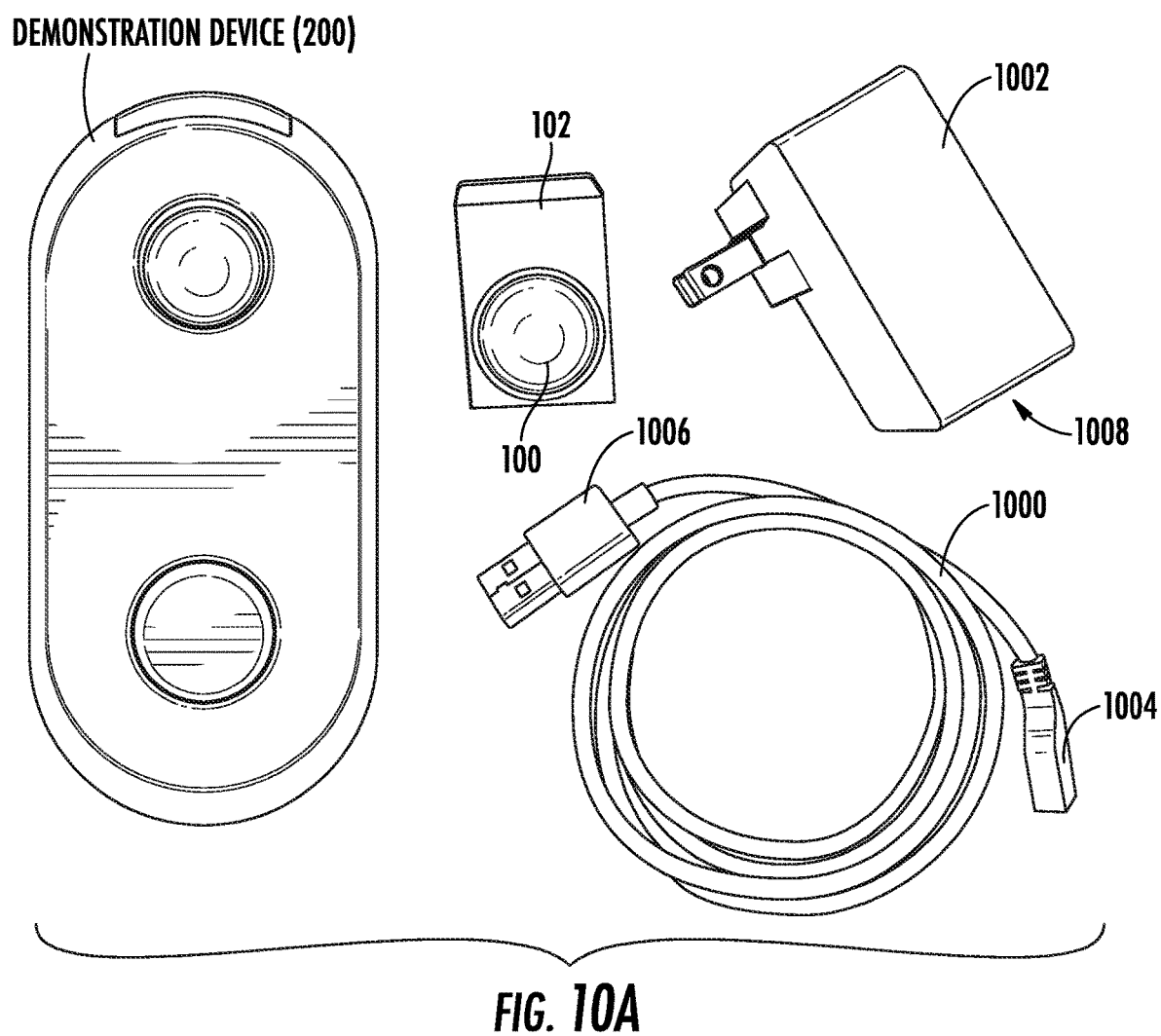
FIGS. 10A and 10B illustrate the photochromic contact lens demonstration device in FIGS. 2A-2C and its exemplary components with the charging cable and power converter in attached and unattached configurations, respectively.
Figure 10B:
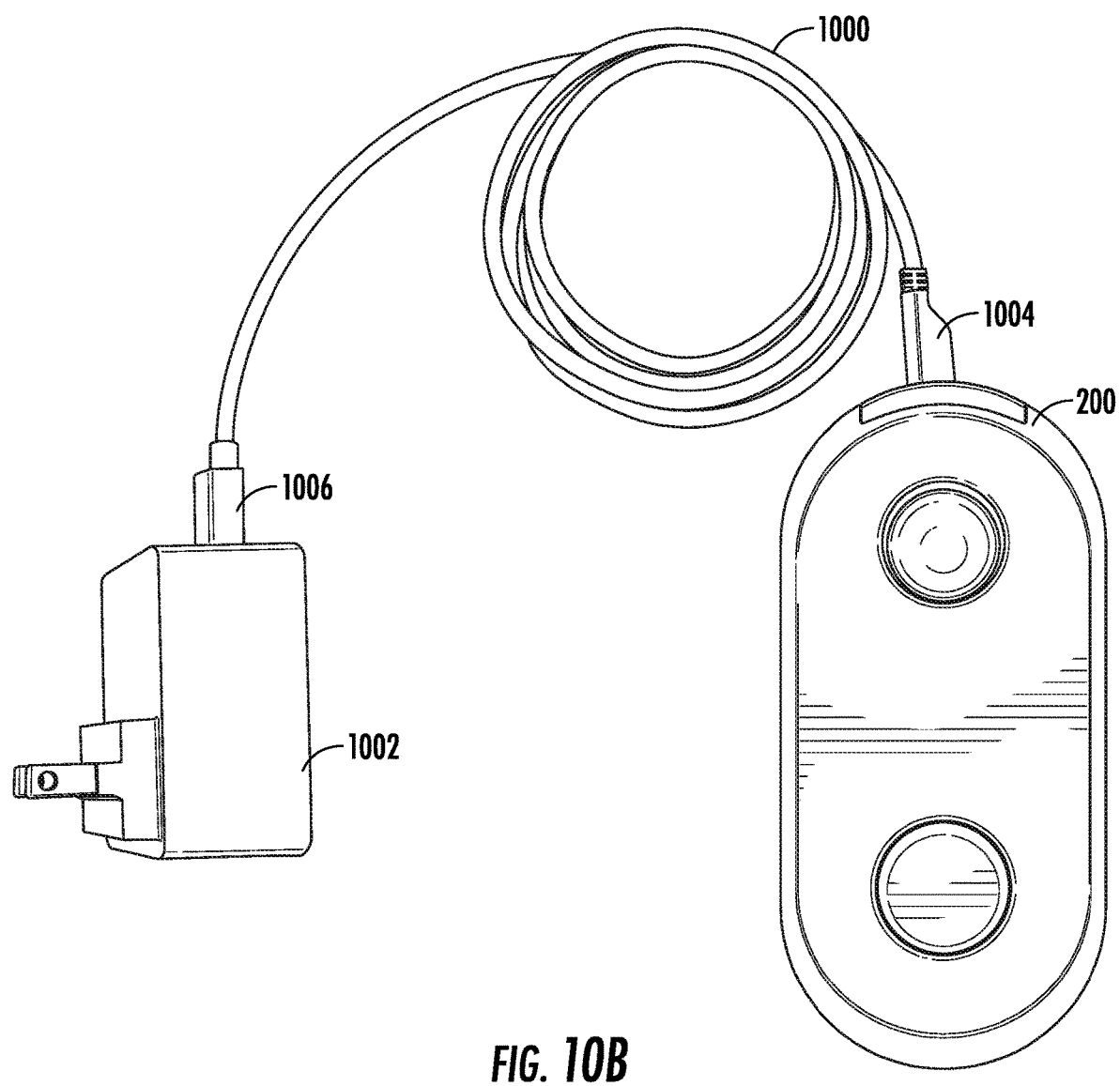

FIGS. 10A and 10B illustrate the demonstration device 200 in FIGS. 2A-2C and its exemplary power charging components that include a charging cable 1000 and power converter 1002 (e.g., an alternating current (AC)-to-direct current (DC) converter) in attached and unattached configurations, respectively. As shown in FIGS. 10A and 10B, and discussed in regard to FIG. 5, the demonstration device 200 includes a battery charging port 534 that is configured to receive a USB connector 1004 of the charging cable 1000. The other end of the charging cable 1000 includes a USB connector 1006 that is configured to be inserted into a port 1008 of the power converter 1002. Thus, when the power converter 1002 is plugged into external power source, such as an AC power outlet, the power converter 1002 is configured to convert the AC power to DC power to provide the DC power to the control circuit 204 as discussed in FIG. 5.

FIG. 11 illustrates an exemplary battery charging process 1100 of the photochromic contact lens demonstration device 200 in FIGS. 2A-2C. As illustrated in FIG. 11, and with reference to the previous discussion regarding the battery 532 charging in FIG. 5, when the controller 505 detects the charging cable 1000 coupled to the battery charging port 534, the controller 505 is configured to instruct the lighting circuit 515 to deactivate the UV/HEV LEDs 256 and activate the visible LEDs 258 to indicate the charging state as shown in step 1102(1). If the controller 505 determines that the battery 532 is not fully charged based on a signal from the battery detector circuit 533, the controller 505 instructs the lighting circuit 515 to flash the visible LEDs 258 to be on for a defined period of time (e.g., 0.5 seconds), and then off for another defined period of time (e.g., 2 seconds). Once the controller 505 determines that the battery 532 is fully charged based on a signal from the battery detector circuit 533, the controller 505 instructs the lighting circuit 515 to deactivate the visible LEDs 258 in step 1102(2).

Figure 12:
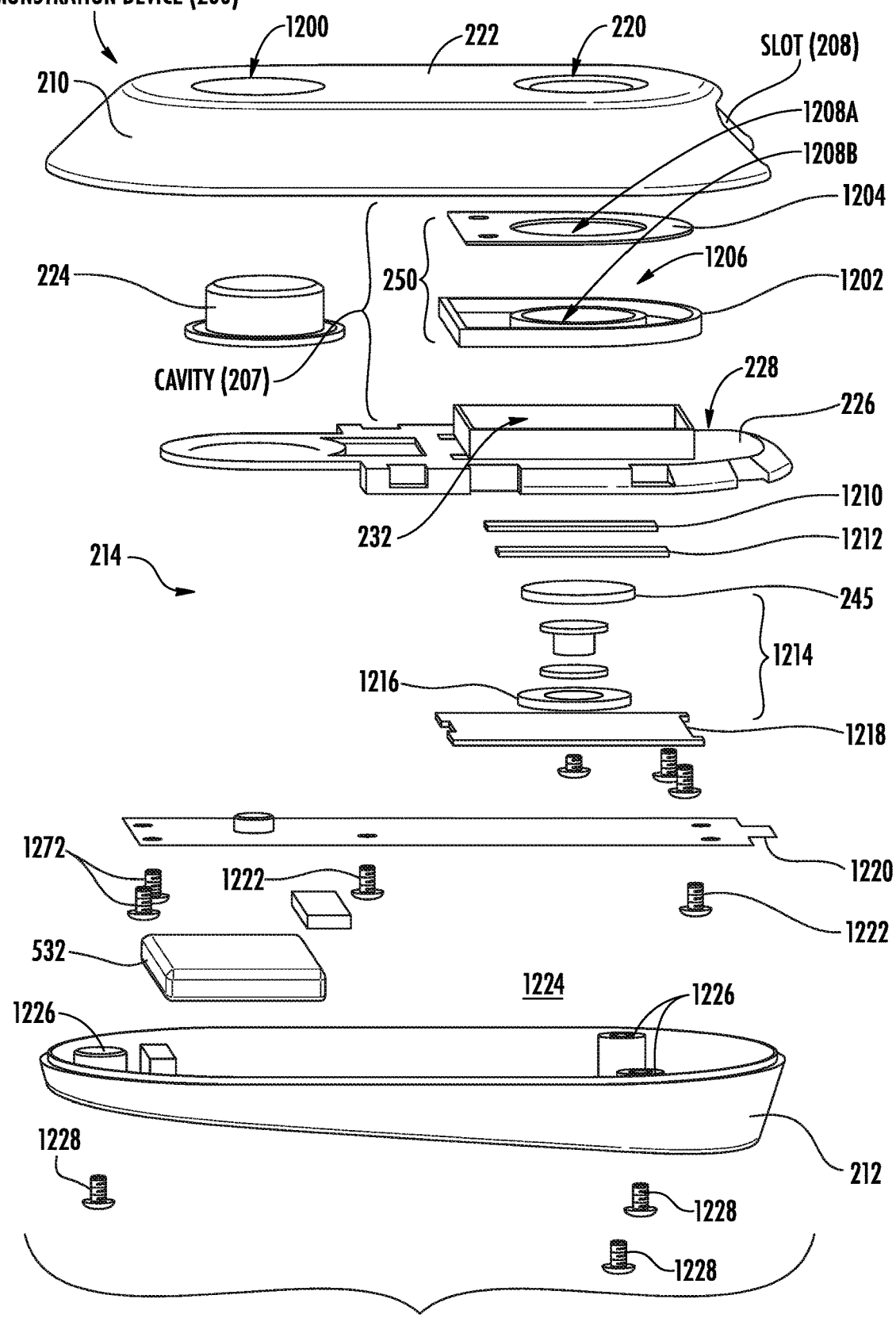
FIG. 12 illustrates the photochromic contact lens demonstration device in FIGS. 2A-2C in an exploded view.

FIG. 12 illustrates the demonstration device 200 in FIGS. 2A-2C in an exploded view to further illustrate exemplary physical components of the demonstration device 200. As illustrated in FIG. 12, the demonstration device 200 includes an outer cover 210 that is configured to be secured to the base 212 to form an interior chamber 214. As previously discussed, the viewing window 220 is disposed through the outer surface 222 of the cover 210. The cover 210 also includes an opening 1200 to receive the switch 224 to provide an external access to the switch 224 by a user, which is a button in this example. The interior component 226 is configured to fit inside the interior chamber 214 of the housing 202 and forms a bottom surface 228 of the slot 208. The lighting lens 250 that houses the UV/HEV LEDs 256 and visible LEDs 258 is shown as being configured to fit between the interior component 226 and the cover 210. The lighting lens 250 is formed by a base 1202 that receives a cover 1204 to form an interior chamber 1206 that is configured to house the PCB 254 of the lighting device 206 (see FIG. 2E) that has the UV/HEV LEDs 256 and visible LEDs 258 mounted thereon. The base 1202 and cover 1204 of the lighting lens 250 have openings 1208A, 1208B that are axially aligned to each other to provide clear access between the viewing window 220 and a contact lens package 102 that can be inserted in the contact lens region 232 formed in the interior component 226. Waterproof silicon plugs 1210, 1212 are disposed between the interior component 226 and the heating element 245 that is part of a heating element assembly 1214. A silicon o-ring 1216 is disposed between the heating element assembly 1214 and a heating plate 1218. A divider 1220 is provided that is configured to be secured by fasteners 1222 to the cover 210 to secure the heating element assembly 1214 below and to the interior component 226 to align the heating element 245 to the contact lens region 232 and to provide a separate compartment 1224 between the divider 1220 and the base 212 to house the battery 532. The base 212 includes bores 1226 that are configured to receive fasteners 1228 (e.g., screws) that are fixedly attached to receivers (not shown) in the cover 210 to secure the cover 210 to the base 212.

Figures 1, 13A:
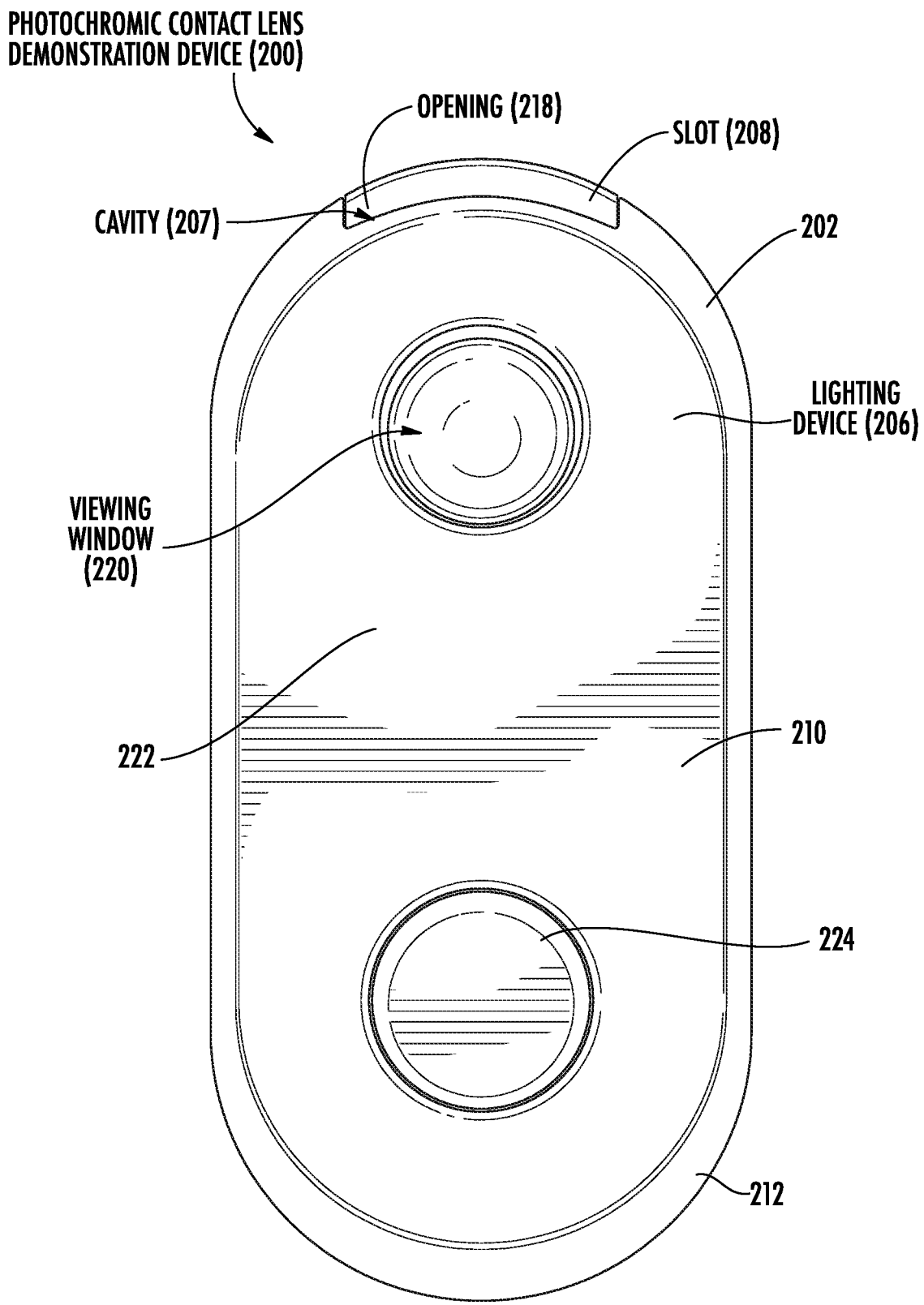
FIGS. 13A-1 and 13A-2 illustrate respective full and partial top views of the photochromic contact lens demonstration device in FIGS. 2A-2C.
Figures 2, 13A:
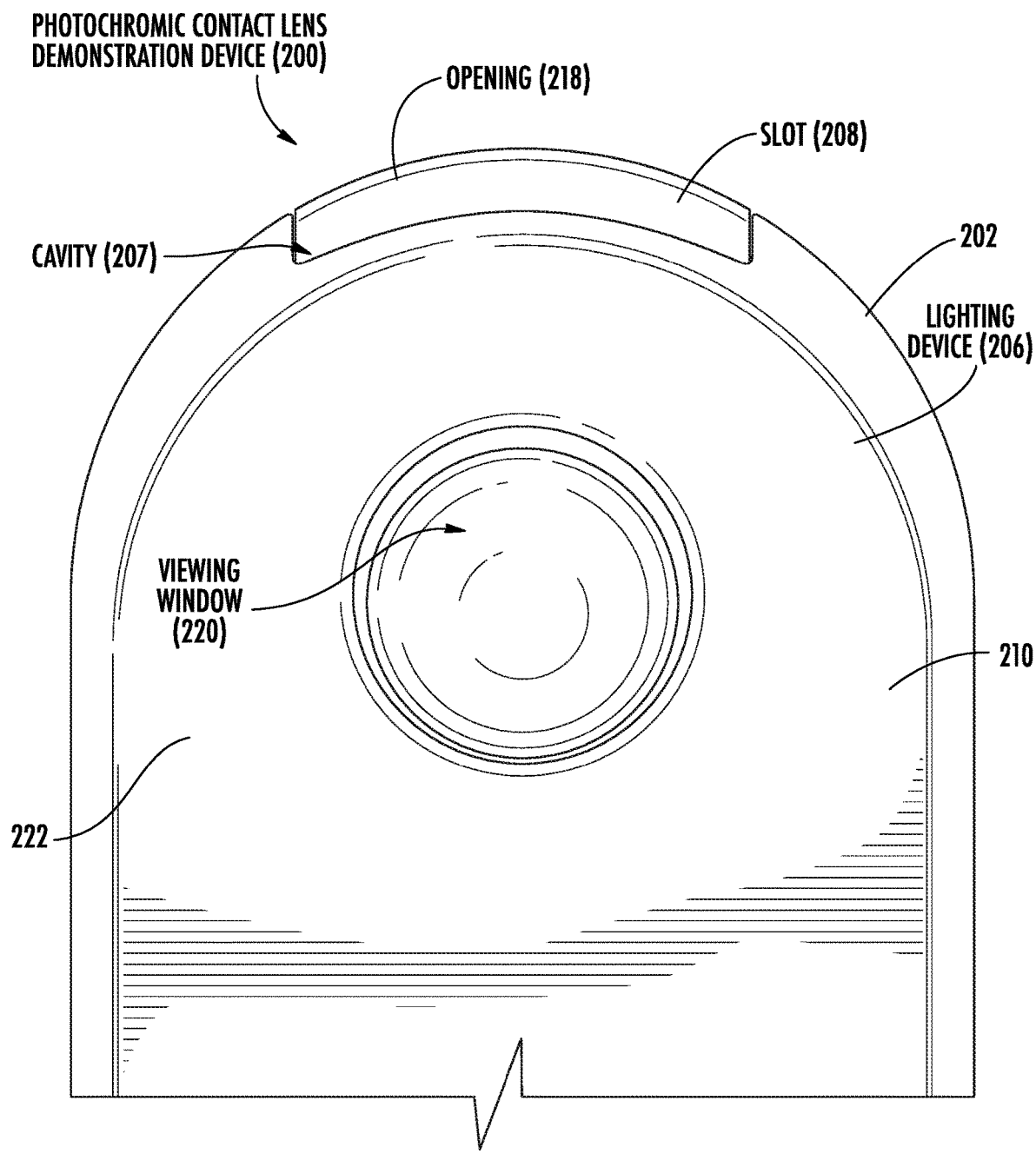
Figure 13B:
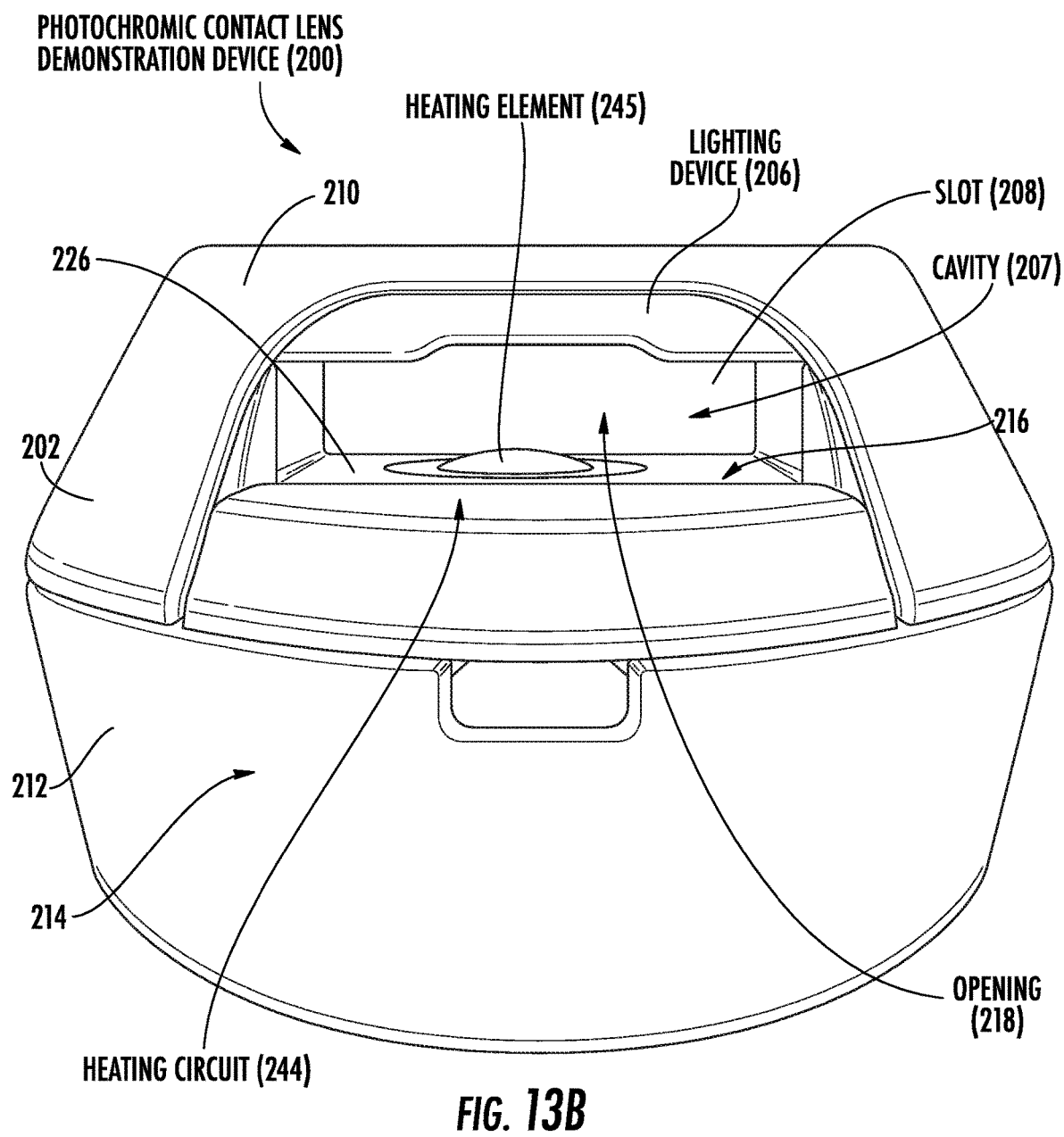
FIG. 13B illustrates a front view of the photochromic contact lens demonstration device in FIGS. 2A-2C.
Figure 13C:
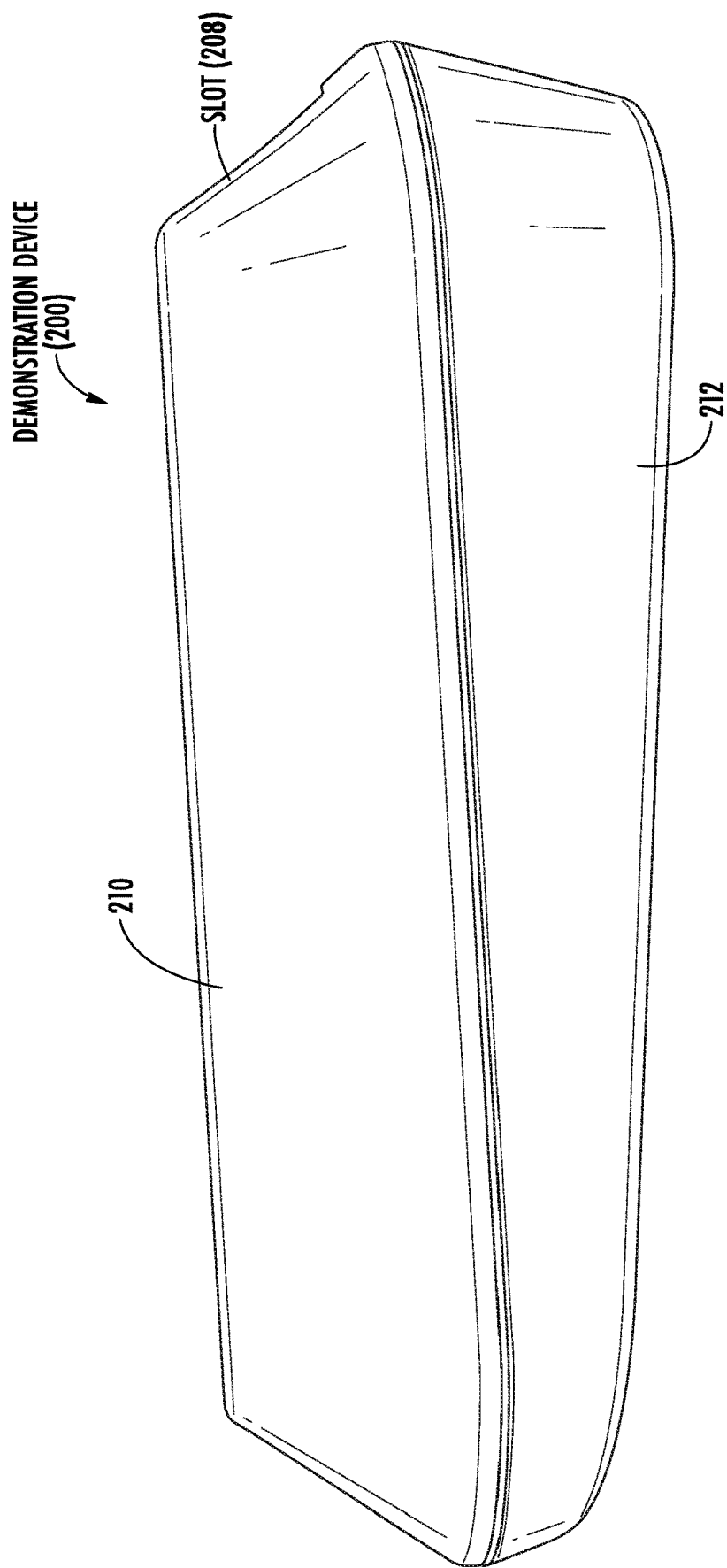
FIG. 13C illustrates a right side view of the photochromic contact lens demonstration device in FIGS. 2A-2C.
Figure 13D:
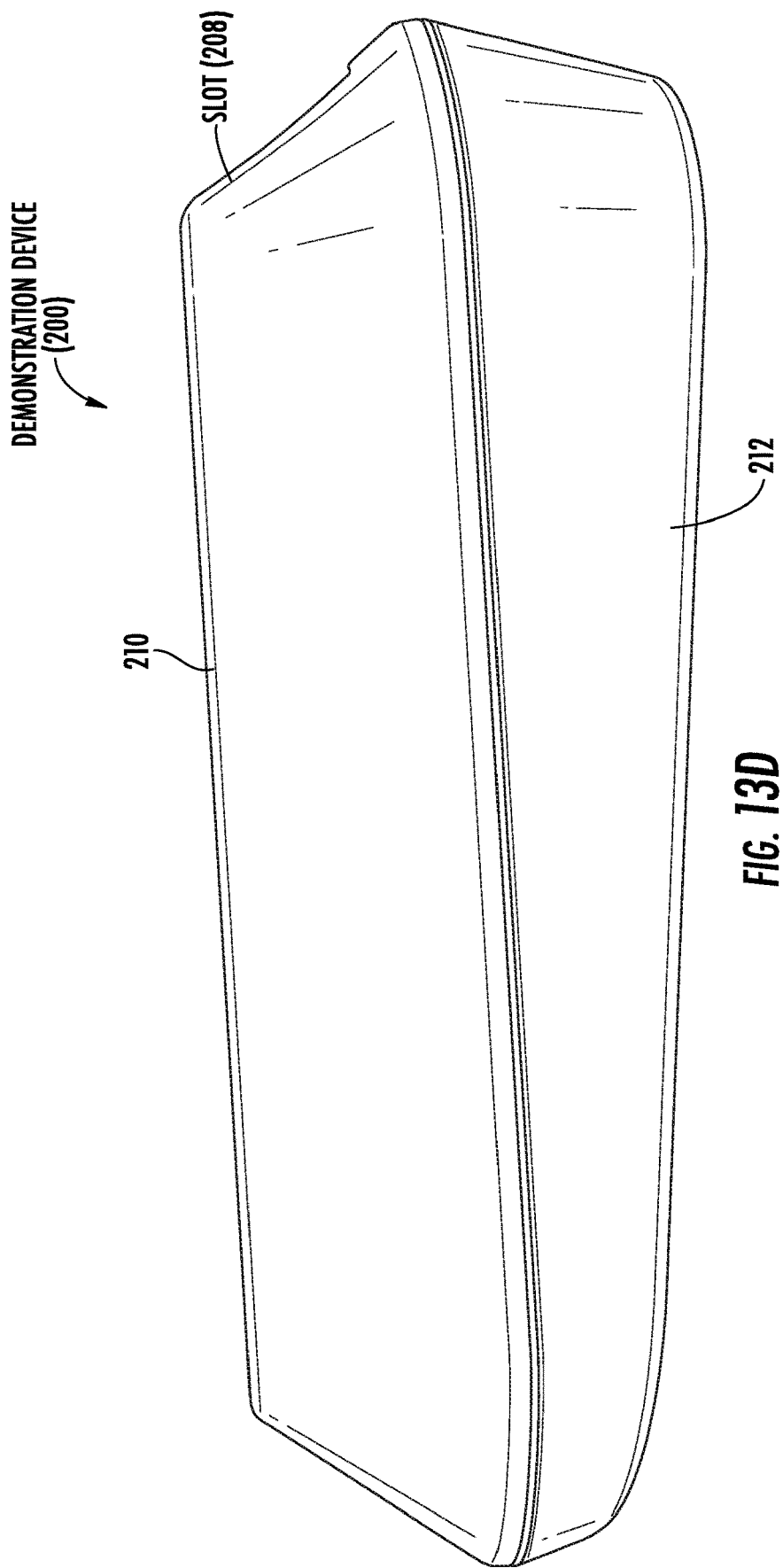
FIG. 13D illustrates a left side view of the photochromic contact lens demonstration device in FIGS. 2A-2C.
Figure 13E:
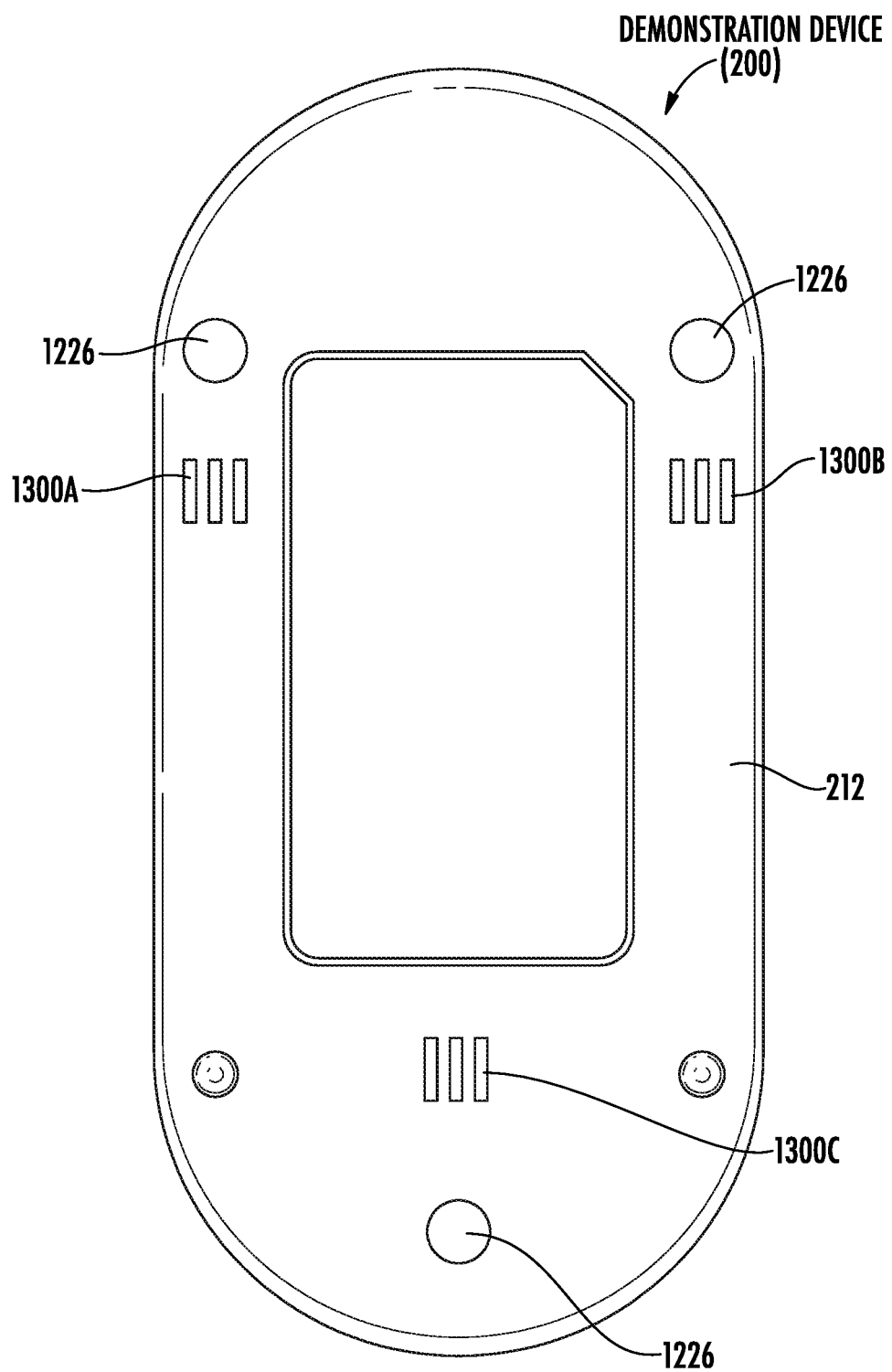
FIG. 13E illustrates a bottom view of the photochromic contact lens demonstration device in FIGS. 2A-2C.

FIGS. 13A-1-13E show the demonstration device 200 fully assembled. FIGS. 13A-1 and 13A-2 illustrate respective full and partial top views of the demonstration device 200 that have been previously described in FIGS. 2A and 2B. FIG. 13B illustrates a front view of the demonstration device 200 that is illustrated in FIG. 2A and previously described. FIGS. 13C and 13D illustrate respective right and left side views of the demonstration device 200 in FIGS. 2A-2C. FIG. 13E illustrates a bottom view of the demonstration device 200 showing the bores 1226 that are configured to receive the fasteners 1228 in FIG. 12 to secure the cover 210 to the base 212. Vents 1300A, 1330B, 1330C may be provided in the base 212 as shown for heat dissipation.

FIGS. 14A and 14B are top and bottom views, respectively, of the heating element assembly 1214 that provides the heating circuit 244 and includes the heating element 245 mounted on a PCB 247. A ribbon interface cable 1400 is coupled to the heating circuit 244 and configured to provide the interfaces 506, 514 between the heating circuit 244 and the controller 505 in FIG. 5. The PCB 247 includes openings 1402A, 1402B that are configured to receive fasteners to attach the PCB 247 to the interior component 226 to dispose the heating element 245 adjacent and aligned to the contact lens region 232. As previously discussed, the heating element 245 is a dome-shaped metal component that is designed to be shaped like a contact lens, so that the direct distance between all points of the heating element 245 and a photochromic contact lens 100 in a contact lens package 102 inserted in the slot 208 of the demonstration device 200 is substantially the same distance, thus heating all areas of photochromic contact lens 100 substantially evenly.

Figure 15A:
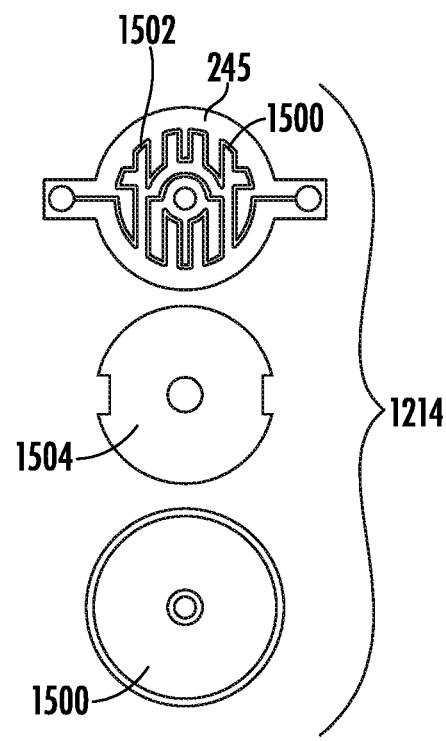
FIG. 15A is an exploded view of the heater assembly that includes the heating circuit and its heating element in FIGS. 14A and 14B.
Figure 15B:
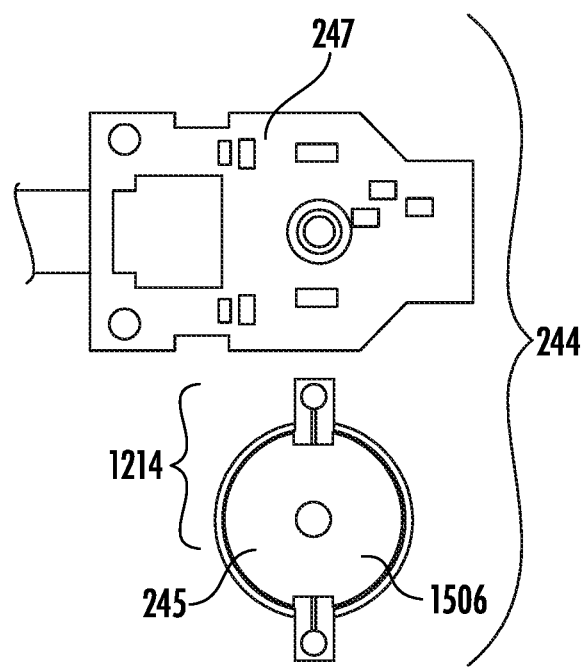
FIG. 15B illustrates a bottom of view of the assembled heating element configured to be mounted on the circuit board of the heater assembly in FIGS. 14A and 14B.

FIGS. 15A and 15B are exploded and assembled views of the heating element assembly 1214 in the heating circuit 244 to illustrate exemplary components of the heating element 245. As shown in FIG. 15A, the heating element assembly 1214 includes a heater 1500 than includes an electrical trace 1502 that is configured to be directly mounted to the PCB 247 in FIG. 15B to couple the electrical trace 1502 to an electrical conductor on the PCB 247 to allow current to flow through the electrical trace 1502. A metal dome cover 1504 is configured to be disposed above and in contact with the heater 1500 to conduct current flowing through the electrical trace 1502 of the heater 1500. A metal dome 1506 is attached on the metal dome cover 1504 to conduct current from the metal dome cover 1504 when the heater 1500 is energized with current.

Note that a photochromic contact lens demonstration device that is configured to control a lighting device and/or heating circuit to apply light and heat to the packaged contact lenses to illustrate the process of a photochromic contact lens changing from a normal, non-darkened state to a darkened state is not limited to the example photochromic contact lens demonstration device 200 discussed above and illustrated in FIGS. 2A-2E. For example, another photochromic contact lens demonstration device that does not include a slot for receiving the contact lens may be used to demonstrate a photochromic contact lens. For example, another photochromic contact lens demonstration device may include a form factor that allows a contact lens to be inserted in a cavity that is formed in a base and that is accessible by a cover that is configured to be opened about the base to provide access to the cavity and closed about the base to secure a contact lens to be demonstrated in the cavity for exposure to light and/or heat and viewing.

In this regard, FIGS. 16A-16C illustrate views of another exemplary photochromic contact lens demonstration device 1600 ("demonstration device 1600") that is configured to control a lighting device and/or heating circuit to apply light and heat to the packaged contact lenses to illustrate the process of a photochromic contact lens changing from a normal, non-darkened state to a darkened state. The demonstration device 1600 includes a cover 1604 with two (2) viewing windows 1602(1), 1602(2) configured to hold two (2) contact lens packages. FIG. 16A illustrates a top view of the demonstration device 1600 with a charging cable connected thereto, which can be the charging cable 1000 in FIG. 10. The demonstration device 1600 includes a cover 1604 that is attached with a hinge 1605 to a base 1606. The cover 1604 is configured to be rotated about the hinge 1605 to be opened from and closed on the base 1606 to allow contact lens packages to be inserted and secured when the cover 1604 is closed and align the contact lenses in the contact lens packages with the viewing windows 1602(1), 1602(2). FIG. 16B illustrates a top view of the demonstration device 1600 with a charging cable not connected. FIG. 16B illustrates a side top, perspective view of the demonstration device 1600. Any of the circuits and components include in the demonstration device 200 in FIGS. 2A-2E can be included in the demonstration device 1600 in FIGS. 16A-16C to activate a lighting device and/or heating circuit to apply light and heat to the packaged contact lenses to illustrate the process of a photochromic contact lens changing from a normal, non-darkened state to a darkened state. As a non-limiting example, the demonstration device 1600 could be configured to activate a lighting device to expose one (1) installed photochromic contact lens package to UV/HEV light while not exposing the other installed photochromic contact lens package to UV/HEV light at the same time. This could allow a person to compare an installed photochromic contact lens that changes to a darkened state to another installed photochromic contact lens that does not change to a darkened state for comparison purposes.

FIGS. 17A and 17B illustrate another exemplary photochromic contact lens demonstration device 1700 ("demonstration device 1700") that is configured to control a lighting device and/or heating circuit to apply light and heat to the packaged contact lenses to illustrate the process of a photochromic contact lens changing from a normal, non-darkened state to a darkened state. The demonstration device 1700 comprises a housing 1701 that includes a cover 1704 with two (2) viewing windows 1702(1), 1702(2) configured to hold two (2) contact lens packages 102 as shown. The cover 1704 is hingedly attached with a hinge 1705 to a base 1706. The cover 1704 is configured to be rotated about the hinge 1705 to be opened from and closed on the base 1706 to allow contact lens packages 102 to be inserted when the cover 1704 is opened and then secured when the cover 1704 is closed and align the photochromic contact lenses 100 with the viewing windows 1702(1), 1702(2). The base 1706 of the housing 1701 forms a cavity 1708 that is configured to receive photochromic contact lenses 100 and align the photochromic contact lenses 100 to respective contact lens regions 1710(1), 1710(2). In this example, the cavity 1708 is configured to receive the contact lens packages 102 that contain photochromic contact lenses 100 and align the photochromic contact lenses 100 to respective contact lens regions 1710(1), 1710(2). The contact lens regions 1710(1), 1710(2) are axially aligned with the respective viewing windows 1702(1), 1702(2) so that the photochromic contact lenses 100 are viewable through the viewing windows 1702(1), 1702(2) when the cover 1704 is closed on the base 1706.

Figure 18A:
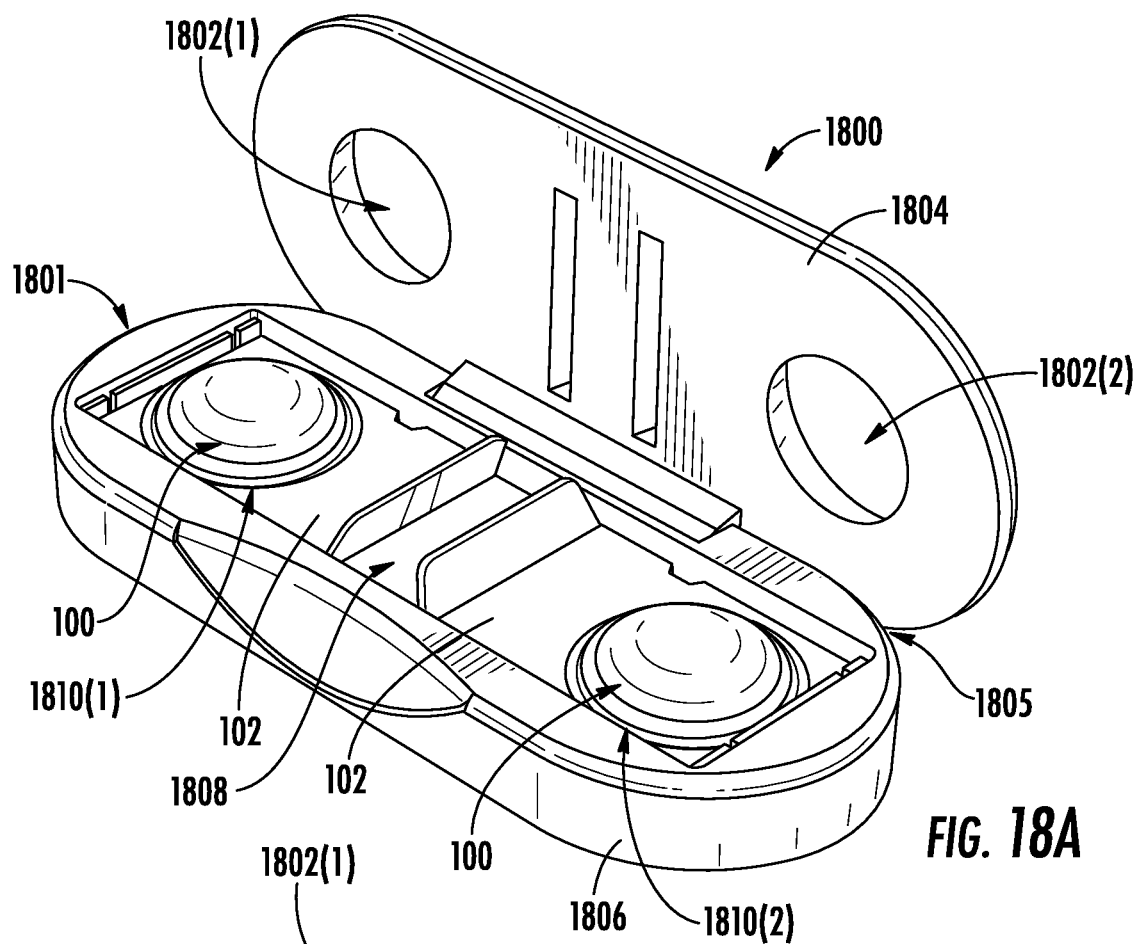
FIGS. 18A and 18B illustrate views of another exemplary photochromic contact lens demonstration device in an open and closed configuration and configured to receive and position two (2) packaged contact lenses aligned with two (2) viewing windows and that can include the circuits and devices, such as those in the photochromic contact lens demonstration device in FIGS. 2A-2C, to activate a lighting device and heating circuit to apply light and heat to the packaged contact lenses to illustrate the process of a photochromic contact lens changing from a normal, non-darkened state to a darkened state.
Figure 18B:
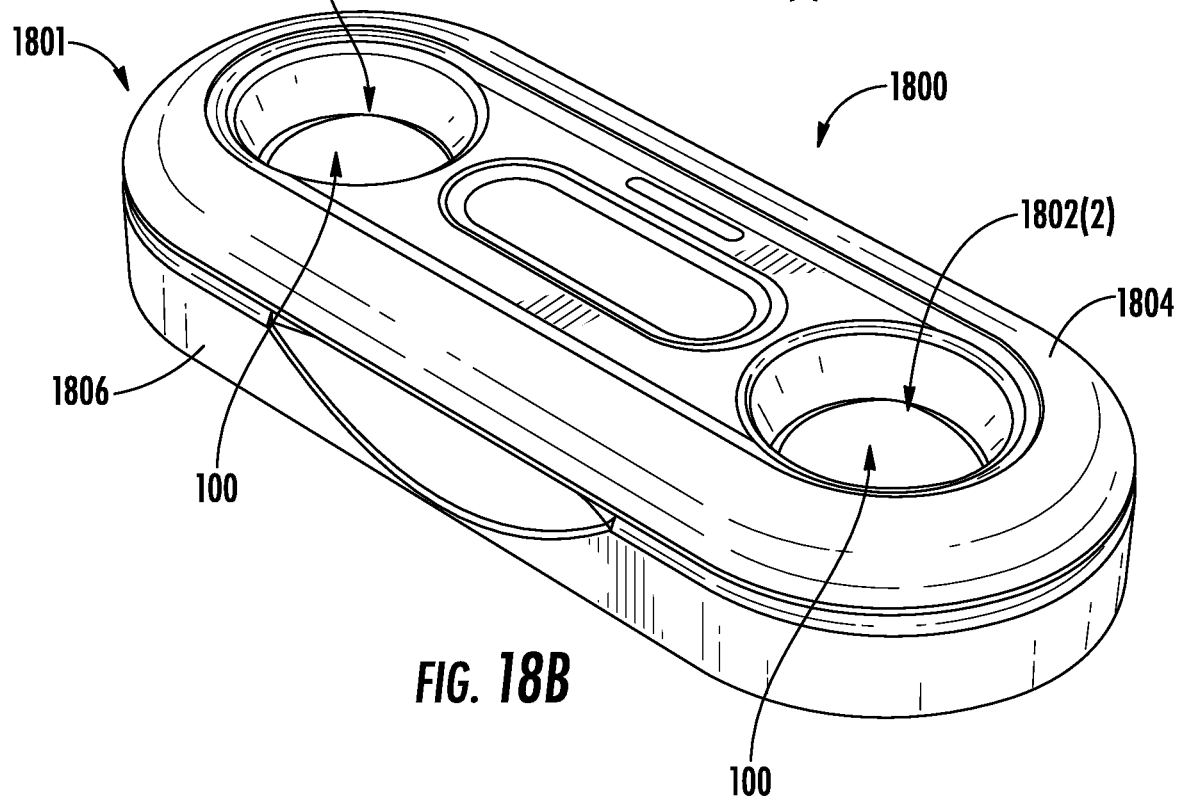

Any of the circuits and components included in the demonstration device 200 in FIGS. 2A-2E can be included in the demonstration device 1700 in FIGS. 17A and 17B to activate a lighting device and/or heating circuit to apply light and heat to the packaged contact lenses to illustrate the process of a photochromic contact lens changing from a normal, non-darkened state to a darkened state. As a non-limiting example, the demonstration device 1700 could be configured to activate a lighting device to expose one (1) installed photochromic contact lens package to UV/HEV light while not exposing the other installed photochromic contact lens package to UV/HEV light at the same time. This could to allow a person to compare an installed photochromic contact lens that changes to a darkened state to another installed photochromic contact lens that does not change to a darkened state for comparison purposes. FIGS. 18A and 18B illustrate another exemplary photochromic contact lens demonstration device 1800 ("demonstration device 1800") that is configured to control a lighting device and/or heating circuit to apply light and heat to the packaged contact lenses to illustrate the process of a photochromic contact lens changing from a normal, non-darkened state to a darkened state. The demonstration device 1800 comprises a housing 1801 that includes a cover 1804 with two (2) viewing windows 1802(1), 1802(2) configured to hold two (2) contact lens packages 102 as shown. The cover 1804 is hingedly attached with a hinge 1805 to a base 1806. The cover 1804 is configured to be rotated about the hinge 1805 to be opened from and closed on the base 1806 to allow contact lens packages 102 to be inserted when the cover 1804 is opened and then secured when the cover 1804 is closed and align the photochromic contact lenses 100 with the viewing windows 1802(1), 1802(2). The base 1806 of the housing 1801 forms a cavity 1808 that is configured to receive photochromic contact lenses 100 and align the photochromic contact lenses 100 to respective contact lens regions 1810(1), 1810(2). In this example, the cavity 1808 is configured to receive the contact lens packages 102 that contain photochromic contact lenses 100 and align the photochromic contact lenses 100 to respective contact lens regions 1810(1), 1810(2). The contact lens regions 1810(1), 1810(2) are axially aligned with the respective viewing windows 1802(1), 1802(2) so that the photochromic contact lenses 100 are viewable through the viewing windows 1802(1), 1802(2) when the cover 1804 is closed on the base 1806.

Any of the circuits and components included in the demonstration device 200 in FIGS. 2A-2E can be included in the demonstration device 1800 in FIGS. 18A and 18B to activate a lighting device and/or heating circuit to apply light and heat to the packaged contact lenses to illustrate the process of a photochromic contact lens changing from a normal, non-darkened state to a darkened state. As a non-limiting example, the demonstration device 1800 could be configured to activate a lighting device to expose one (1) installed photochromic contact lens package to UV/HEV light while not exposing the other installed photochromic contact lens package to UV/HEV light at the same time. This could allow a person to compare an installed photochromic contact lens that changes to a darkened state to another installed photochromic contact lens that does not change to a darkened state for comparison purposes.

Figure 19A:
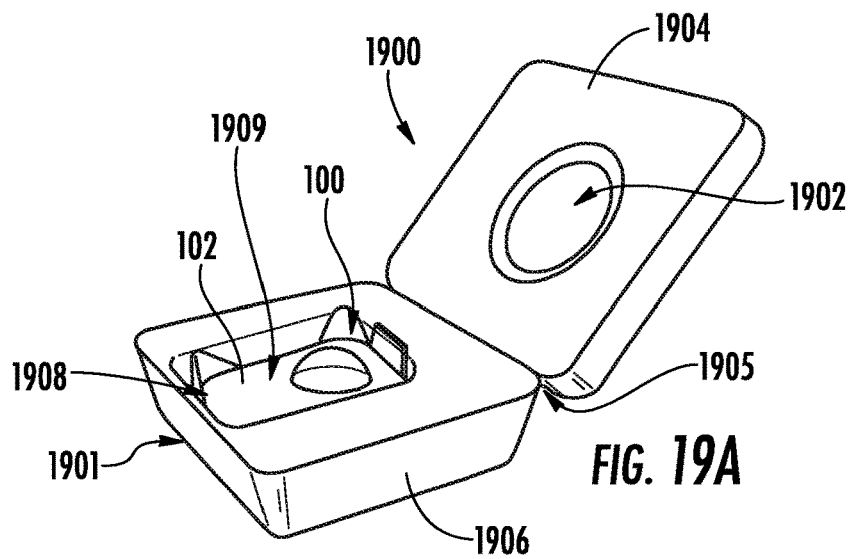
FIGS. 19A-19C illustrate other exemplary photochromic contact lens demonstration devices that include a viewing window(s) and circuits and devices, such as those in the photochromic contact lens demonstration device in FIGS. 2A-2C, to activate a lighting device and heating circuit to apply light and heat to the packaged contact lenses to illustrate the process of a photochromic contact lens change from a normal, non-darkened state to a darkened state.
Figure 19B:
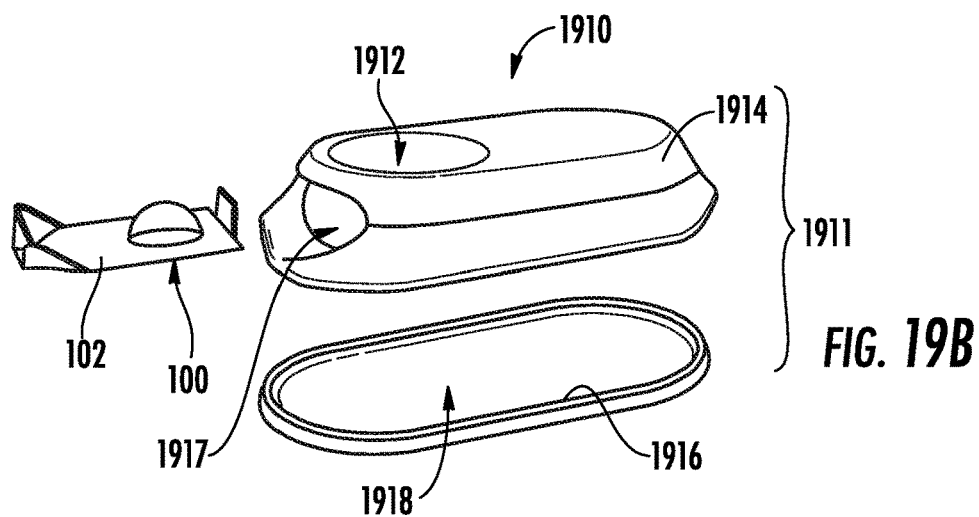
Figure 19C:
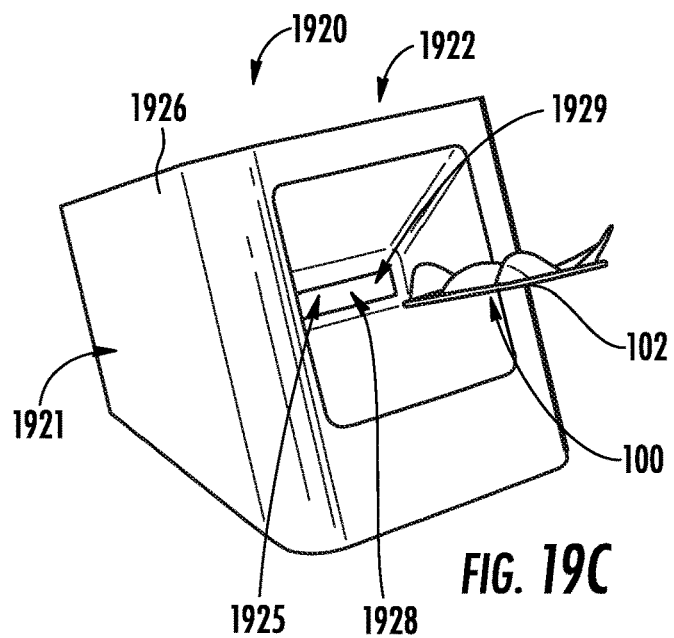

FIGS. 19A-19C illustrate other exemplary photochromic contact lens demonstration devices 1900, 1910, 1920 that are each configured to control a lighting device and/or heating circuit to apply light and heat to the packaged contact lenses to illustrate the process of a photochromic contact lens changing from a normal, non-darkened state to a darkened state. The photochromic contact lens demonstration device 1900 ("demonstration device 1900") in FIG. 19A comprises a housing 1901 that includes a cover 1904 with one (1) viewing window 1902 that is configured to hold one (1) contact lens package 102 as shown. The cover 1904 is hingedly attached to a base 1906 with a hinge 1905. The hinge 1905 may be a living hinge formed by a left-over material from a mold of the cover 1904 and base 1906. The cover 1904 is configured to be rotated about the hinge 1905 to be opened from and closed on the base 1906 to allow a contact lens package 102 to be inserted when the cover 1904 is opened and then secured when the cover 1904 is closed and align a photochromic contact lens 100 with the viewing window 1902. The base 1906 of the housing 1901 forms a cavity 1908 that is configured to receive a photochromic contact lens 100 and align the photochromic contact lens 100 to a contact lens region 1909. In this example, the cavity 1908 is configured to receive the contact lens package 102 that contains a photochromic contact lens 100 and align the photochromic contact lens 100 to the contact lens region 1909. The contact lens region 1909 is axially aligned with the viewing window 1902 so that the photochromic contact lens 100 is viewable through the viewing window 1902 when the cover 1904 is closed on the base 1906.

Any of the circuits and components included in the demonstration device 200 in FIGS. 2A-2E can be included in the demonstration device 1900 in FIG. 19A to activate a lighting device and/or heating circuit to apply light and heat to the packaged contact lenses to illustrate the process of a photochromic contact lens changing from a normal, non-darkened state to a darkened state.

The photochromic contact lens demonstration device 1910 ("demonstration device 1910") in FIG. 19B is similar to the demonstration device 200 in FIGS. 2A-2C. The demonstration device 1910 includes a housing 1911 that includes a cover 1914 with one (1) viewing window 1912 that is configured to hold one (1) contact lens package 102 as shown. The cover 1914 is attached to a base 1916 and configured to be opened and closed about the base 1916 to allow a contact lens package 102 to be inserted and secured when the cover 1914 is closed and align a photochromic contact lens 100 with the viewing window 1912. The base 1916 of the housing 1911 forms a cavity 1918 that is configured to receive a photochromic contact lens 100 and align the photochromic contact lens 100 to a contact lens region 1917. In this example, the cavity 1918 is configured to receive the contact lens package 102 that contains a photochromic contact lens 100 and align the photochromic contact lens 100 to respective contact lens region 1917. The contact lens region 1917 is axially aligned with the viewing window 1912 so that the photochromic contact lens 100 is viewable through the viewing window 1912 when the cover 1914 is closed on the base 1916.

Any of the circuits and components included in the demonstration device 200 in FIGS. 2A-2E can be included in the demonstration device 1910 in FIG. 19B to activate a lighting device and/or heating circuit to apply light and heat to the packaged contact lenses to illustrate the process of a photochromic contact lens changing from a normal, non-darkened state to a darkened state.

The photochromic contact lens demonstration device 1920 ("demonstration device 1920") in FIG. 19C includes a housing 1921 that includes a base 1926 with one (1) viewing window 1922 that is configured to hold one (1) contact lens package 102 as shown. The base 1926 is configured to receive an inserted contact lens package 102 through a slot 1925 that can be viewed through the viewing window 1922. The slot 1925 forms a cavity 1928 that is configured to receive a photochromic contact lens 100 and align the photochromic contact lens 100 to a contact lens region 1929. In this example, the cavity 1928 is configured to receive the contact lens package 102 that contains the photochromic contact lens 100 and align the photochromic contact lens 100 to the contact lens region 1929. The contact lens region 1929 is axially aligned with the viewing window 1922 so that the photochromic contact lens 100 is viewable through the viewing window 1922 when the contact lens package 102 is inserted into the slot 1925.

Any of the circuits and components included in the demonstration device 200 in FIGS. 2A-2E can be included in the demonstration device 1920 in FIG. 19C to activate a lighting device and/or heating circuit to apply light and heat to the packaged contact lenses to illustrate the process of a photochromic contact lens changing from a normal, non-darkened state to a darkened state.

Figure 20:
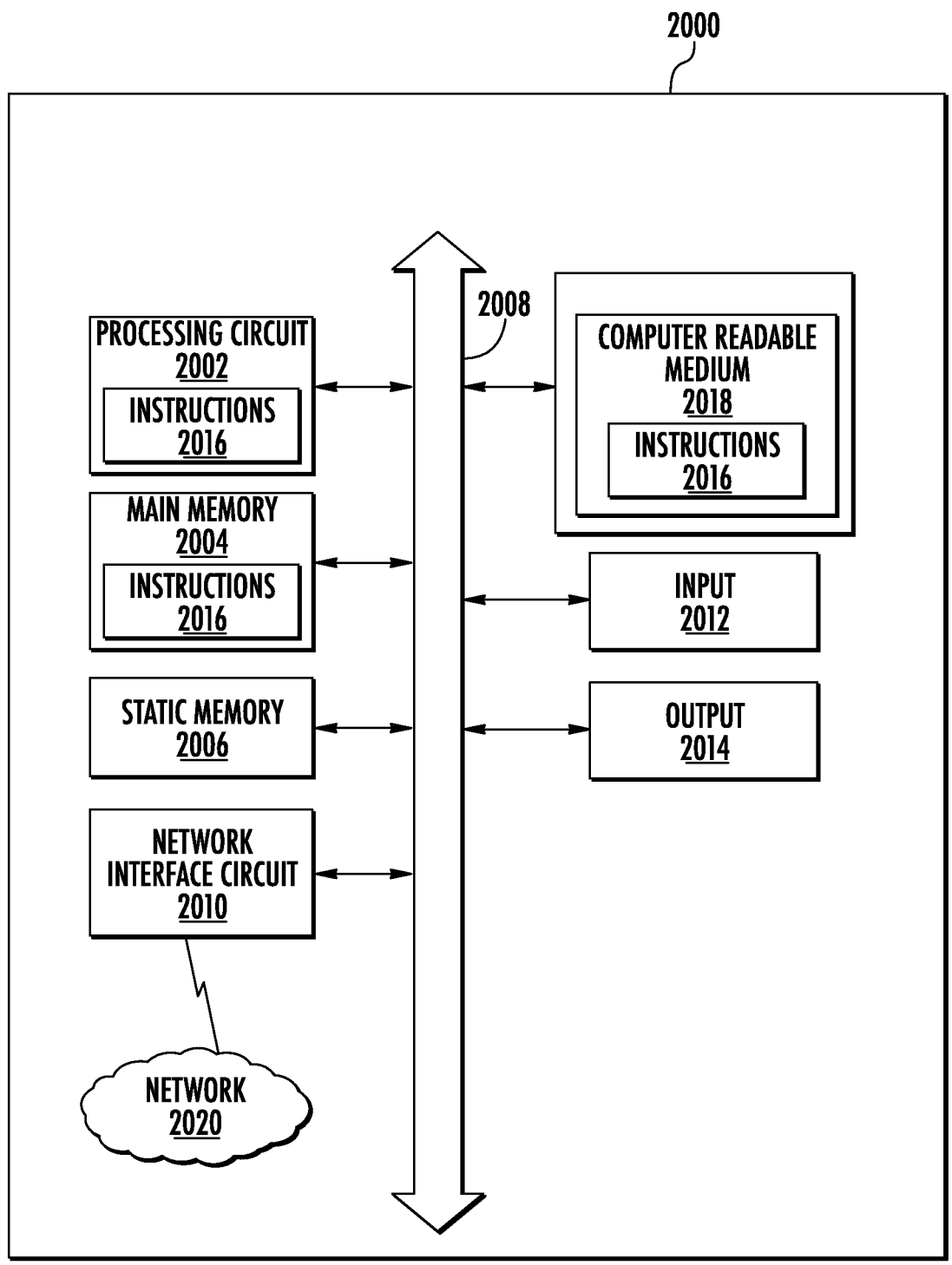
FIG. 20 is a schematic diagram of a representation of an exemplary computer system that can be included in the controller circuit of a photochromic contact lens demonstration device, including the photochromic contact lens demonstration devices in FIGS. 2A-2C, 16A-16C, 17A-17B, 18A-18B, and 19A-19C, wherein the exemplary computer system is configured to execute instructions from an exemplary computer-readable media.

The control circuit 204 and/or its controller 505 in the photochromic contact lens demonstration devices 200, 1600, 1700, 1800, 1900, 1910, 1920 in FIGS. 2A-2C, 16A-16C, 17A-17B, 18A-18B, and 19A-19C can include a computer system 2000, such as shown in FIG. 20, that is configured to execute software instructions to carry out the processes and control operations discussed herein. The exemplary computer system 2000 in this embodiment includes a processing circuit 2002 or processor 2002, a main memory 2004 (e.g., read-only memory (ROM), flash memory, dynamic random access memory (DRAM) such as synchronous DRAM (SDRAM), etc.), and a static memory 2006 (e.g., flash memory, static random access memory (SRAM), etc.), which may communicate with each other via a data bus 2008. Alternatively, the processing device 2002 may be connected to the main memory 2004 and/or static memory 2006 directly or via some other connectivity means. The processing device 2002 may be a controller, and the main memory 2004 or static memory 2006 may be any type of memory.

The processing device 2002 represents one or more general-purpose processing devices such as a microprocessor, central processing unit, or the like. More particularly, the processing device 2002 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 2002 is configured to execute processing logic in instructions 2016 for performing the operations and steps discussed herein.

The computer system 2000 may further include a network interface circuit 2010. The computer system 2000 also may or may not include an input 2012 to receive input and selections to be communicated to the computer system 2000 when executing instructions. The computer system 2000 also may or may not include an output 2014, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 2000 may or may not include a data storage device that includes instructions 2016 stored in a computer-readable medium 2018. The instructions 2016 may also reside, completely or at least partially, within the main memory 2004 and/or within the processing circuit 2002 during execution thereof by the computer system 2000, the main memory 2004 and the processing circuit 2002 also constituting computer-readable medium. The instructions 2016 may further be transmitted or received over a network 2020 via the network interface circuit 2010.

While the computer-readable medium 2018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents

What is claimed is:

1. A contact lens demonstration device, comprising:
   a housing;
   a cavity disposed in the housing forming an interior surface in the housing comprising a contact lens region, the cavity configured to receive a contact lens and align the contact lens to the contact lens region;
   a viewing window disposed in an outer surface of the housing axially aligned to the contact lens region;
   a lighting device disposed in the cavity, the lighting device configured to emit UltraViolet (UV) or High-Energy Visible (HEV) light to the contact lens region;
   a control circuit disposed in the housing and coupled to the lighting device, the control circuit configured to activate the lighting device to emit UV or HEV light to the contact lens region; and
   a heating circuit comprising a heating element and aligned to the contact lens region, the heating circuit configured to cause the heating element to generate heat in the contact lens region, the control circuit being coupled to the heating circuit and configured to activate the heating circuit to cause the heating element to generate heat in the contact lens region;
   wherein the heating element comprises a dome-shaped metal component disposed in the contact lens region, the dome-shaped metal component electrically coupled to the control circuit.

2. The contact lens demonstration device of claim 1, wherein the lighting device is configured to emit a light that includes a wavelength between 200-460 nanometers (nm).

3. The contact lens demonstration device of claim 1, wherein the viewing window comprises an opening through the outer surface of the housing.

4. The contact lens demonstration device of claim 1, further comprising a switch disposed in the housing and coupled to the control circuit, the control circuit configured to activate the lighting device to emit UV or HEV light to the contact lens region in response to activation of the switch.

5. The contact lens demonstration device of claim 1, wherein the lighting device is further configured to emit visible light to the contact lens region;
   the control circuit configured to activate the lighting device to emit visible light to the contact lens region.

6. The contact lens demonstration device of claim 5, further comprising a light selector circuit coupled to the control circuit and the lighting device;
   the light selector circuit configured to control the lighting device to emit UV or HEV light, or visible light in response to a light selection signal received from the control circuit.

7. The contact lens demonstration device of claim 5, wherein the control circuit is further configured to activate the lighting device to emit the visible light to the contact lens region in response to activation of a switch coupled to the control circuit.

8. The contact lens demonstration device of claim 7, wherein the control circuit is configured to activate the lighting device to pulse the visible light to the contact lens region in response to the activation of the switch.

9. The contact lens demonstration device of claim 7, further comprising a heating circuit comprising a heating element disposed in the cavity and aligned to the contact lens region, the heating circuit coupled to the control circuit and configured to cause the heating element to generate heat in the contact lens region;
   the control circuit further configured to activate the heating circuit to cause the heating element to generate heat in the contact lens region in response to the activation of the switch.

10. The contact lens demonstration device of claim 9, wherein the control circuit is configured to activate the lighting device and activate the heating circuit for a defined initialization period after the activation of the switch.

11. The contact lens demonstration device of claim 9, further comprising a temperature sensor disposed in the housing and coupled to the control circuit, the temperature sensor configured to generate a temperature signal representing the temperature in the contact lens region;
   wherein the control circuit is further configured to:
   measure the temperature in the contact lens region based on the temperature signal generated by the temperature sensor; and
   deactivate the lighting device to discontinue the emission of the visible light to the contact lens region in response to the measured temperature exceeding a defined threshold temperature.

12. The contact lens demonstration device of claim 11, wherein the control circuit is configured to activate the lighting device to emit UV or HEV light to the contact lens region in response to re-activation of the switch.

13. The contact lens demonstration device of claim 12, wherein the control circuit is configured to continue to activate the heating circuit to cause the heating element to generate heat in the contact lens region in response to the re-activation of the switch.

14. The contact lens demonstration device of claim 12, wherein the control circuit is further configured to:
   deactivate the lighting device to discontinue the emission of the UV or HEV light to the contact lens region; and
   re-activate the lighting device to re-emit visible light to the contact lens region.

15. The contact lens demonstration device of claim 14, wherein the control circuit is further configured to deactivate the lighting device to discontinue the emission of the visible light in the contact lens region.

16. The contact lens demonstration device of claim 1, wherein the heating circuit is configured to cause the heating element to generate heat in the contact lens region of at least 35 degrees Celsius.

17. The contact lens demonstration device of claim 1, wherein the heating circuit is configured to cause the heating element to generate heat in the contact lens region of 48-57 degrees Celsius.

18. The contact lens demonstration device of claim 1, further comprising a temperature sensor disposed in the housing and coupled to the control circuit, the temperature sensor configured to generate a temperature signal representing the temperature in the contact lens region.

19. The contact lens demonstration device of claim 18, wherein the control circuit is further configured to regulate the activation of the heating circuit to maintain the temperature in the contact lens region to a defined temperature threshold based on the temperature signal.

20. The contact lens demonstration device of claim 1, further comprising a battery disposed in the housing and coupled to the control circuit, the battery configured to provide power to the control circuit.

21. The contact lens demonstration device of claim 20, further comprising a battery charging port disposed in the outer surface of the housing;
wherein the control circuit further comprises a charge management circuit coupled to the battery charging port, the charge management circuit configured to charge the battery from an external power source connected to battery charging port.

22. The contact lens demonstration device of claim 1, wherein the cavity is configured to receive the contact lens by being configured to receive a contact lens package and align the contact lens in the contact lens package to the contact lens region.

23. The contact lens demonstration device of claim 1, wherein the cavity comprises a slot disposed in the housing, the slot comprising a distal end forming an opening in the outer surface of the housing and a proximal end within the housing disposed a distance from the distal end, the slot forming the interior surface in the housing comprising the contact lens region, the slot configured to align the contact lens to the contact lens region.

24. The contact lens demonstration device of claim 23, wherein the slot is configured to receive a contact lens package containing the contact lens through the opening and align the contact lens in the contact lens package to the contact lens region.

25. The contact lens demonstration device of claim 1, wherein the housing comprises a cover and a base, the cover configured to be opened about the base and closed on the base to form the cavity, and wherein the cavity is configured to receive the contact lens when the cover is opened about the base.

26. The contact lens demonstration device of claim 1, wherein the cavity further defines a second interior surface disposed above the interior surface and adjacent to the viewing window; and
further comprising a lighting housing attached to the second interior surface, the lighting housing comprising the lighting device.

27. The contact lens demonstration device of claim 26, wherein the lighting housing comprises a circular-shaped housing having an opening, the opening axially aligned with the viewing window.

28. A method of demonstrating a change of a photochromic lens from a non-darkened state to a darkened state when not inserted into an eye, comprising:
inserting a contact lens into a cavity disposed in a housing to align the contact lens to a contact lens region inside the housing, the housing comprising a viewing window disposed in an outer surface of the housing axially aligned with the contact lens region; and
activating a control circuit coupled to a lighting device disposed in the cavity; and
the control circuit activating the lighting device disposed in the cavity to emit visible light to the contact lens region in response to activation of a switch coupled to the control circuit;
the control circuit further activating a heating circuit comprising a heating element disposed in the cavity, the heating element aligned to the contact lens region generating heat in the contact lens region in response to the activation of the switch;
the control circuit measuring the temperature in the contact lens region, and deactivating the lighting device to discontinue the emission of the visible light to the contact lens region in response to the measured temperature exceeding a defined threshold temperature; and
activating the lighting device by the control circuit in response to the activation of the control circuit to cause the lighting device to emit UltraViolet (UV) or High-Energy Visible (HEV) light to the contact lens region to expose the contact lens to the UV or HEV light for a defined demonstration period of time.

29. The method of claim 28, further comprising the control circuit activating a heating circuit to cause a heating element to generate heat in the contact lens region in response to the activation of the control circuit.

30. The method of claim 29, further comprising the control circuit regulating the heating circuit to control the temperature in the contact lens region to a defined temperature based on a temperature signal representing the temperature in the contact lens region generated by a temperature sensor disposed in the housing and coupled to the control circuit.

31. The method of claim 28, wherein activating the lighting device to emit the visible light comprises pulsing the visible light to the contact lens region in response to the activation of the switch.

32. The method of claim 28, comprising the control circuit activating the heating circuit for a defined initialization period after the activation of the switch.

33. The method of claim 28, comprising the control circuit activating the lighting device to emit the UV or HEV light to the contact lens region in response to re-activation of the switch.

34. The method of claim 28, further comprising the control circuit continuing to activate the heating circuit to cause the heating element to generate heat in the contact lens region in response to the re-activation of the switch.

35. The method of claim 28, further comprising the control circuit:
deactivating the lighting device to discontinue the emission of the UV or HEV light to the contact lens region; and re-activating the lighting device to emit visible light to the contact lens region.

36. The method of claim 35, further comprising the control circuit re-deactivating the lighting device to discontinue the emission of the visible light in the contact lens region.

\* \* \* \* \*